Inventor
Louis Etienne Coste
BY
Michael S. Striker
Attorney

Inventor
Louis Etienne Coste
By
Michael S. Striker
Attorney

Feb. 26, 1963 L. E. COSTE 3,079,081

DIGITAL COMPUTING APPARATUS UTILIZING ALGEBRAIC-BINARY NUMBER REPRESENTATION

Filed Dec. 28, 1959 11 Sheets-Sheet 3

Inventor
Louis Etienne Coste
By
Michael S. Striker
Attorney

Inventor
Louis Etienne Coste
By Michael S. Striker
Attorney

Inventor
Louis Etienne Coste
By
Michael S. Striker
Attorney

Feb. 26, 1963 L. E. COSTE 3,079,081

DIGITAL COMPUTING APPARATUS UTILIZING ALGEBRAIC-BINARY NUMBER REPRESENTATION

Filed Dec. 28, 1959 11 Sheets-Sheet 6

Inventor
Louis Etienne Coste
By Michael S. Striker
Attorney

Feb. 26, 1963 L. E. COSTE 3,079,081

DIGITAL COMPUTING APPARATUS UTILIZING ALGEBRAIC-BINARY NUMBER REPRESENTATION

Filed Dec. 28, 1959 11 Sheets-Sheet 7

Inventor
Louis Etienne Coste
by Michael S. Striker
Attorney

Inventor
Louis Etienne Coste
By
Michael S. Striker
Attorney

Inventor
Louis Etienne Coste
By Michael S. Striker
Attorney

Feb. 26, 1963 L. E. COSTE 3,079,081

DIGITAL COMPUTING APPARATUS UTILIZING ALGEBRAIC-BINARY NUMBER REPRESENTATION

Filed Dec. 28, 1959 11 Sheets-Sheet 10

Inventor
Louis Etienne Coste
By Michael S. Striker
Attorney

Inventor
Louis Etienne Coste
BY Michael S. Striker
Attorney

United States Patent Office 3,079,081
Patented Feb. 26, 1963

3,079,081

DIGITAL COMPUTING APPARATUS UTILIZING ALGEBRAIC-BINARY NUMBER REPRESENTATION

Louis Etienne Coste, 12 Rue du Pere-Mazurie, Chevilly, France

Filed Dec. 28, 1959, Ser. No. 862,159
Claims priority, application France Dec. 27, 1958
24 Claims. (Cl. 235—152)

This invention relates to methods of digital computation utilizing a novel system of number representation derived from the conventional binary system and herein generally termed an "algebraic binary" system.

An algebraic-binary numeration system as herein defined is a system utilizing the three symbols 1, 0 and $\bar{1}$, wherein the first two have the same significance as in ordinary binary numeration and the third has the meaning "minus one." The general feasibility of using these three digits for the representation of numbers can be shown by the following considerations. It is obvious that any multi-digit number can be represented as the algebraic sum of two numbers, one positive and the other negative, and that it can be so represented in an infinite variety of ways. Hence, any number written in the ordinary binary system as a series of 0 and 1 symbols can equally well be represented, in an infinite variety of ways, as a series of the three symbols 1, 0, $\bar{1}$, such that if the said series is separated into two other series of one of which derives from the first by replacing all the $\bar{1}$'s therein by 0's, and the other by replacing all the 1's by 0's, then the resulting two series will each represent two numbers in ordinary binary notation, a positive and a negative number, whose algebraic sum will be equal to the initial binary number. The two resulting numbers thus obtained may be termed the positive and negative parts, respectively, of the algebraic binary number.

To illustrate this by an example, consider the ordinary binary number 11101 (decimal 29). This can be represented, inter alia, by any of the following algebraic-binary notations:

(*a*) $1000\bar{1}\bar{1}$, wherein the positive part is 100000 and the negative part $\bar{1}\bar{1}$, this is equivalent to representing the initial (decimal) number 29 as the difference (in decimal) 32—3=29.

(*b*) $10\bar{1}101$, wherein the positive part is 100101, and the negative part is $\bar{1}000$, this being equivalent to decimal 37—8=29.

(*c*) $100\bar{1}1\bar{1}$, wherein the positive part is 100010 and the negative part is $\bar{1}0\bar{1}$, i.e. decimal 34—5=29.

According to a basic feature of this invention binary numbers are represented, in a digital computer, as algebraic-binary numbers having their positive and negative parts carried on separate lines, and these positive and negative part numbers are separately processed in accordance with the rules of binary calculus.

The many and important advantages of this method of computation will be made clear as the disclosure proceeds.

Within the set of all possible algebraic-binary representations of a given number, there is a subset that possesses the remarkable property that nowhere does it include two units of similar sign in adjacent digital positions. In the above example, it is clear that representations (*b*) and (*c*) satisfy this condition whereas representation (*a*) does not since it includes two units both of negative sign in the first and second digital places.

Those algebraic-binary ("AB") representations that satisfy the condition just stated that they do not anywhere have two units of a common sign in adjacent binary places will herein sometimes be termed rectified algebraic-binary representations ("RAB" for short).

The basic feature that makes for the interest of the RAB representation is that it is possible to effect the addition (and subtraction) of two numbers written in the RAB notation by separately adding their positive and negative parts, without any transfer of carry units ever being required over two or more binary places. Since such transfer of carries has constituted the chief difficulty encountered in the adder circuitry of conventional computing machines especially of the parallel type, the use of the RAB notation in accordance with this invention will make it possible vastly to simplify such adder (and related) circuitry and achieve corresponding savings in equipment and/or operating time.

That no carry transfer can occur in the addition of two numbers written in RAB notation is evident when one considers that, in adding for example the positive parts of the two given RAB numbers, if we assume that a carry is encountered at a certain binary place of such two positive numbers, this means that the two numbers must each contain a 1 at the said binary place; but in that case, by the definition of RAB notation, neither number can contain a 1 in the binary position of immediately higher order, and hence the carry unit can be entered at such last-named position without being able to produce a further carry.

According to an important feature of the invention, there is made available a simple and convenient method of converting any ordinary binary number into a rectified algebraic binary, or RAB, number. The method comprises converting each 1 of the number into the group $1\bar{1}$ and in deleting (i.e. replacing with 0) the positive unit 1 in such group every time such positive unit coincides in position with the negative digit $\bar{1}$ of another similar group resulting from the conversion of a 1-digit of the original binary number at the said position. In decimal terms, this means, in effect, that the (decimal) value 1 of the original number is replaced by the equivalent value 2—1, the value 2 by the equivalent value 4—2, and so on. Or more generally and in binary terms, the conversion process of the invention replaces each binary value $10^n$ in the initial number by the equivalent binary value $10^{n+1}-10^n$. The resulting representation is a special and univocal instance of the rectified algebraic binary or RAB notation defined above, and will sometimes be termed herein the "normal" algebraic binary or NAB notation. Referring to the previously given example, it will readily be seen that (*c*) is a NAB representation of the number 29 selected as the example.

A quick way of converting an ordinary binary into a NAB number is to replace therein every 1 followed on its left by a 0, with a group $1\bar{1}$, and every group of a plurality of juxtaposed 1's followed at the left by a 0, with a group $10\ .\ .\ .\ 0\bar{1}$, wherein the binary position of the right-hand negative unit corresponds in position to the right-hand unit of the group to be converted, and the position of the left-hand positive unit is displaced one binary place leftward with respect to the position of the left-hand unit in the group being converted.

I am aware that various three-digit systems of number representation have been proposed heretofore, utilizing the same three symbols 1, 0 and $\bar{1}$ as in the system of my invention or equivalent symbols. To the best of my knowledge however, none of such prior three-digit systems have been used for the purpose of consistently representing a binary number as the algebraic sum of a positive and a negative part number, and separately processing these part numbers. Further, to my knowledge none of such prior three-digit systems have made use of the basic and broad condition formulated above that they should not anywhere contain units of a common sign in adjacent binary positions, for the purpose of averting "carry-transfer" in algebraic addition operations. Furthermore, and for this very reason, the conversion method applied according to my invention for converting ordinary binary numbers into NAB numbers in which such condition is sure to be satisfied, is not to be found in the prior literature. Hence in turn, the apparatus, chiefly consisting of logical circuitry, hereinafter described by me as constituting means for implementing the above-formulated condition and effecting the conversion method, as well as for related purposes to be specified, are believed to be novel.

Broad objects of my invention therefore are to compute faster and more economically than was heretofore possible; to provide improved parallel computing apparatus; and to avert "carry-transfer" in addition and subtraction as performed with automatic computers. More specific objects are to provide improved means for: Converting an ordinary binary number into a so-called rectified algebraic binary number (RAB); adding or subtracting in parallel two or more algebraic-binary numbers without carry-transfer; converting algebraic-binary numbers in which the basic condition involving absence of similar-sign digits in adjacent positions is not satisfied, into algebraic-binary numbers in which such condition is satisfied (i.e. converting AB numbers to RAB numbers); adding and subtracting two or more ordinary binary numbers without carry-transfer by methods based on rectified algebraic-binary representation but without requiring preliminary conversion of the addend numbers into such representation; multiplying a pair of binary numbers by means of improved and simplified parallel matrix circuitry in which the partial-sum totalizing operations involved in any multiplication are performed in parallel in accordance with the above-defined teachings of this invention and hence are free from carry-transfer; discriminating the sign of an algebraic-binary number prior to converting it into an ordinary binary number; converting an algebraic-binary number serially into an ordinary binary number for entry into storage or for output; converting an algebraic-binary number in parallel into an ordinary binary number; checking the operation of at least some of the afore-enumerated means. The above and further objects of my invention will be made clear as the disclosure proceeds.

The invention will now be described for purposes of illustration but not of limitation with reference to the accompanying drawings which are circuit diagrams in functional or/and logical schematic form, of exemplary circuits for carrying out the teachings of this invention. In the drawings:

FIG. 1 is a general functional diagram of a totalizing apparatus for effecting algebraic summation of ordinary binary numbers in accordance with a first embodiment; the component circuits of this apparatus being shown in logical details in the ensuing FIGS. 2 to 6;

FIG. 2 partly shows a parallel input coder or converter unit indicated by block TBA in FIG. 1 for converting ordinary binary into NAB numbers;

Figure 1:
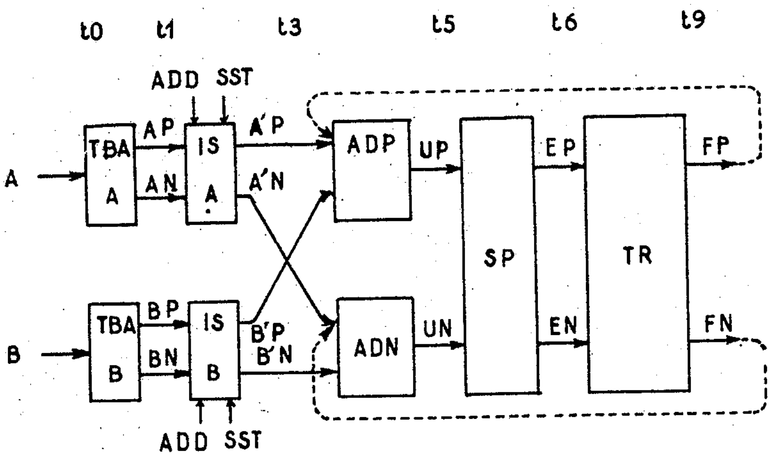

Before turning to the listed figures for a description of the actual circuits used according to the invention, some basic aspects of the latter will be examined in further detail.

As indicated earlier, a basic coding process used herein for converting an ordinary binary number into an algebraic-binary number having no adjacent digits of similar sign (a "RAB" number), is to transpose every value such as binary $10^n$ therein into a binary value $(10^{n+1}-10^n)$ while canceling any opposite-sign digits such transposal may have introduced. When this coding process is applied to a binary number, it is found that every isolated digit 1 in the number, that is every 1 positioned between two 0's (or between a 0 and an end of the number) is displaced one binary place in the direction of higher order position (i.e. normally leftward), and a negative digit $\bar{1}$ is simultaneously introduced into the position corresponding to said isolated 1 in the initial number. It is further found that wherever the initial number contains a group of adjacent 1 digits (rather than an isolated 1), the conversion process yields a positive digit 1 in the binary position next higher than (i.e. leftward of) the highest digit 1 in the original group, and a negative digit $\bar{1}$ in the position corresponding to the lowermost digit 1 of the initial group, with 0's in all intervening positions.

Thus, consider the ordinary binary number $$A=101001111001$$

Applying the transposing-and-cancelling process just described we can convert this immediately into the equivalent normal algebraic-binary ("NAB") number $$A=1\bar{1}1\bar{1}01000\bar{1}01\bar{1}$$

However this conversion process may for purposes of clarification be split up into a number of steps as follows:

$$A=\ 101001111001 \quad (1)$$

$$1010011110010 \quad (2)$$

$$\bar{1}0\bar{1}00\bar{1}\bar{1}\bar{1}\bar{1}00\bar{1} \quad (3)$$

$$AP=1010010000010 \quad (4)$$

$$AN=\ \bar{1}0\bar{1}00000\bar{1}00\bar{1} \quad (5)$$

$$A=1\bar{1}1\bar{1}01000\bar{1}01\bar{1} \quad (6)$$

(1) shows the original binary number. (2) shows the binary number obtained by replacing every value $10^n$ of the original number A by the value $10^{n+1}$ which is twice higher. (3) shows the number obtained by replacing every value $10^n$ of A by its negative $-10^n$. (4) shows the result obtained by canceling from (2) all of the 1's that correspond in binary position to $\bar{1}$'s in (3), and similarly (5) is the result of canceling from (3) all of the $\bar{1}$'s that correspond in position to 1's in (2). Finally (6) is obtained by adding together both numbers AP and AN of (4) and (5), and represents the final algebraic binary ("NAB") number. AP and AN are the positive and negative parts, respectively, of this last number. It will be evident that, in view if the manner in which the final number (6) was obtained, it can contain no two adjacent digits of similar sign. Moreover, it is seen that in the two "part" numbers AP and AN, there can be no digits of opposite sign in corresponding positions, since such digits would cancel each other.

Considering two ordinary binary numbers a straightforward method of adding them without carry-transfer would comprise, according to the invention, first converting both numbers into their algebraic binary (NAB) equivalents, then separately adding the positive parts and the negative parts of the two NAB numbers, and finally (and optionally) combining the resulting positive number and negative number into an algebraic binary number equivalent to the sum of the two given numbers. Clearly the two steps of adding the positive and negative parts will not involve any transfer of carry units over more than one binary position, for the reasons previously explained. However, the final algebraic binary number obtained by combining the positive and negative numbers in the above process, will not generally be either a "NAB" or a "RAB" number, but it will be a simple "AB" number, since it will generally include adjacent digits of similar sign. All this will be made clear by the following example.

Assume it is desired to add the number A of the preceding example to a number $B=1001100011011$. Let us write both numbers A and B, followed by their NAB equivalents, and followed by the positive and negative parts of these equivalents:

Original numbers:

$$A=101001111001 \qquad B=1001100011011 \qquad (7)$$

NAB equivalents:

$$1\bar{1}1\bar{1}01000\bar{1}01\bar{1} \qquad 1\bar{1}010\bar{1}0010\bar{1}10\bar{1} \qquad (8)$$

Positive parts:

$$AP=1010010000010 \qquad BP=10010000100100 \qquad (9)$$

Negative parts:

$$AN=\bar{1}0\bar{1}00000\bar{1}00\bar{1} \qquad BN=\bar{1}000\bar{1}0000\bar{1}00\bar{1} \qquad (10)$$

Now add both positive parts $AP+BP=UP$:

$$AP=1010010000010 \qquad (11)$$
$$BP=10010000100100 \qquad (12)$$
$$UP=AP+BP=11100010100110 \qquad (13)$$

and similarly add both negative parts $AN=BN=UN$:

$$AN=\bar{1}0\bar{1}00000\bar{1}00\bar{1} \qquad (14)$$
$$BN=\bar{1}000\bar{1}0000\bar{1}00\bar{1} \qquad (15)$$
$$UN=AN+BN=\bar{1}\bar{1}0\bar{1}\bar{1}000\bar{1}00\bar{1}0 \qquad (16)$$

The two numbers UP and UN can be considered as constituting the positive and negative parts, respectively, of an algebraic binary number U which is the desired sum U=A+B. Thus, if it was desired merely to add the two numbers A and B, it is seen that this problem has been solved by the performance of two separate addition steps $(AP+BP)$ and $(AN+BN)$ neither of which has involved any transfer of carries. In many instances however it is required to add more than just two binary numbers together. Thus assume it is desired to add some further binary number C to the sum U. Such further addition cannot be performed directly by the method just described, as by adding the positive part of the NAB equivalent of C to UP and the negative part of the NAB equivalent of C to UN. This is because neither UP nor UN are RAB numbers, as will be immediately apparent when one notices that UP contains adjacent positive digits and UN contains adjacent negative digits. According to the invention, then, the following procedure is used.

First it is to be noted that positive and negative digits present at corresponding digital positions in UP and UN respectively may be mutually cancelled out without altering the sum U. Thus UP and UN can be rewritten as EP and EN as follows:

$$EP=10000010100100 \qquad (17)$$
$$EN=000\bar{1}\bar{1}000\bar{1}0000 \qquad (18)$$

which are respectively the positive and negative parts of the sum $$U=E=1000\bar{1}\bar{1}101\bar{1}0100 \qquad (19)$$

This has of course not eliminated the difficulty since EN (for example in this instance) still contains adjacent negative digits.

We now convert either one of the two numbers EP or EN, for instance EP, into the corresponding NAB number by the method previously indicated, and we obtain:

$$EP=1\bar{1}00001\bar{1}1\bar{1}01\bar{1}00 \qquad (20)$$

If now we delete all correspondingly positioned positive and negative units from EP and EN (lines (20) and (18)), and simultaneously carry all negative units from EP into the corresponding positions of EN (which positions necessarily contain 0's or else the $\bar{1}$'s therein would have been cancelled out), we get the new number pair $$EP=100000001001000 \qquad (21)$$
$$EN=\bar{1}000\bar{1}0\bar{1}0\bar{1}\bar{1}0\bar{1}00 \qquad (22)$$

which is obviously equivalent to any of the preceding pairs.

Next we convert the modified number EN by a procedure similar to that previously described for converting an ordinary binary number into a NAB number (it being evident that EN can be considered as an ordinary binary number of negative sign), except that we refrain from altering those $\bar{1}$'s of EN that are present at next higher order positions relative to a $\bar{1}$ obtained by this conversion process. That is, considering the above number EN in line (22) and starting from its right hand end, the $\bar{1}$ present in third binary position is converted to $\bar{1}1$, with the 1 being placed in third position of the new number and the $\bar{1}$ in fourth position; the $\bar{1}$ present in fifth position of EN is not altered since it is of next higher order position relative to the said $\bar{1}$ in fourth position; the $\bar{1}$ present in 6th position of EN is converted to $\bar{1}1$; and so on. We thereby obtain the new number EN $$EN=\bar{1}100\bar{1}10\bar{1}\bar{1}1\bar{1}\bar{1}100 \qquad (23)$$

* * wherein the asterisks indicate those $\bar{1}$'s of the earlier EN number that were retained unaltered in accordance with the procedure just defined. The resulting EN value is still equivalent to the former EN value. If now we can cancel from the former EP number and the new EN number all 1's and $\bar{1}$'s in corresponding positions, we obtain the further pair $$FP=010001000100100 \qquad (24)$$
$$FN=0000\bar{1}00\bar{1}00\bar{1}0000 \qquad (25)$$

This pair is equivalent to the original EP, EN pair but it is seen that each of the two numbers in it now satisfies the requisite condition that it contains no digits of common sign in adjacent positions, so this pair can now be used for further totalization with a third number C by the procedure described. It may be noted that if FP and FN are combined into a single algebraic binary number:

$$F=100\bar{1}10\bar{1}01\bar{1}0100 \qquad (26)$$

this is equivalent to the previously indicated quantity E as can easily be proved e.g. by computing the decimal equivalents of both numbers. It is further noted that F is a RAB number, although it is not a NAB number.

The above procedure described in connection with addition is obviously applicable to subtraction; it is simply necessary to change the sign of all the digits of the subtrahend; the sign of the result is the sign of its most significant digit.

Referring now to FIG. 1 of the drawings, this illustrates a block schematic of an adder apparatus according to the invention automatically performing the procedure just described for adding any quantity of ordinary binary numbers without carry transfer. Throughout the drawings, the symbols such as *t0*, *t1*, . . . shown at the top of FIG. 1 for example serve to indicate successive elementary time periods of the computation process which are generally determined by a train of clock pulses produced in any suitable way as will be well understood by those familiar with digital computer operation. The initial time period *t0* for each circuit illustrated is here selected arbitrarily.

In the apparatus of FIG. 1, two identical coder units TBA–A and TBA–B are respectively supplied in parallel with the digital information representing the respective ordinary binary numbers A and B to be added, from respective memories of any suitable type not shown, such as ordinary binary registers. This parallel input of both binary numbers A and B occurs at time *t0*. Each coder unit operates, in a manner presently described with reference to FIG. 2, so as to derive from the respective number A or B supplied to it, a pair of positive and negative part binary numbers respectively, which are the positive and negative parts AP and AN, and BP and BN, of the respective numbers A and B, as written in lines (9) and (10) above in connection with an example. This derivation or coding action requires one clock period, i.e. is completed at time *t1*.

Each coder unit is followed by a sign selector IS–A and IS–B respectively (to be described with reference to FIG. 3). The sign selectors each have two control lines ADD and SST leading thereto, a selected one of which is energized depending upon whether the operation to be performed on A and B is addition or subtraction. If addition is ordered, the digital information from selector input lines AP and AN are passed respectively to output lines A'P and A'N of the A-selector, and from lines BP and BN to lines B'P and B'N of the B-selector; whereas if subtraction is ordered the connections in a suitable one of the sign-selectors are effectively reversed so that in IS–B for example the bits from BP are passed to B'N and the bits from BN to B'P. At time *t3* the positive information carried on lines A'P and B'P of the respective sign selectors are applied to a positive adder ADP, and the negative information on lines A'N and B'N are applied to a negative adder ADN.

The adder units ADN and ADP are similar and will later be described in detail. Their function is respectively to add the positive parts and the negative parts separately, as exemplified in Equations 13 and 16 previously given, and at time *t5* the resulting positive and negative binary numbers are delivered over respective sets of lines UP and UN to the suppressor or mutual-inhibitor unit SP, hereinafter described with reference to FIG. 5. As will be shown the suppressor SP acts so as to cancel any 1 digits in both the numbers applied over the sets of lines UP and UN wherever such 1 digits occur at corresponding positions in both numbers. Thus the two sets of output lines EP and EN from the suppressor contain, at the time *t6*, the respective numbers exemplified hereinabove by Equations 17 and 18, and constituting the positive and negative parts of an algebraic binary number which is the desired sum of A and B.

As will be apparent from earlier explanations the part of FIG. 1 so far described constitutes an adder system enabling two binary numbers to be added in parallel without carry transfer, so that where the addition of no more than two numbers is contemplated the described system may be regarded as complete in itself. The two numbers appearing on the respective sets of output lines EP and EN may be stored in separate memories, or recombined, and may be reconverted into ordinary binary form by means later described. However, in accordance with a preferred aspect of the invention, the system in FIG. 1 further includes a so-called transcriber unit TR for further processing the two said numbers in order to convert them to a "RAB" form that will enable the system to totalize more than two input numbers, in accordance with what has been explained.

Figure 6:
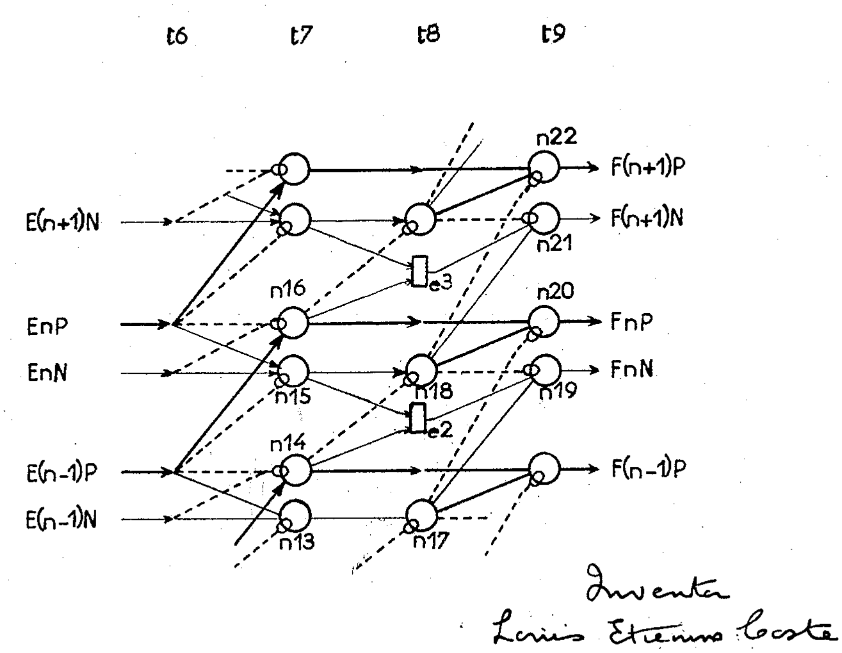
FIG. 6 shows circuitry for converting an AB number into a RAB number prior to addition to a further RAB number, as indicated by block TR in FIG. 1.

The action of the transcriber TR will be explained in detail further below (FIG. 6). The result of this action is to deliver at the time *t9*, on the two sets of parallel output lines FP and FN, two numbers of the kind exemplified by Equations 24 and 25 above, i.e. a positive and a negative binary number neither of which contains 1 digits in adjacent positions.

The output lines FP and FN are shown connected back to the direct input of positive adder ADP and the cross-connected input of negative adder ADN respectively, for the subsequent addition of a further binary number applied through input B, to the sum of the first two numbers.

Figures 2, 3:
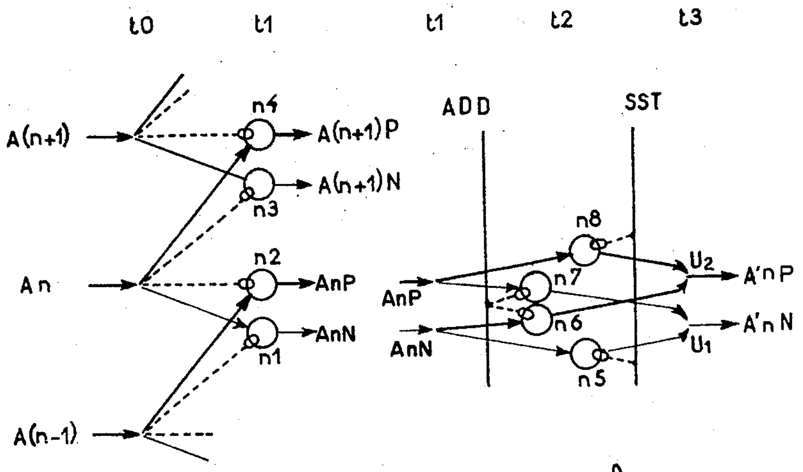
FIG. 3 is a sign selector circuit indicated by block IS in FIG. 1.

FIG. 2 illustrates one embodiment of logical circuitry for coding an ordinary binary number into its NAB equivalent, as may be used for each of the coders TBA–A and TBA–B in FIG. 1. This opportunity is taken of defining the symbols used throughout the drawings in representing the various logical elements involved.

Figure 4:
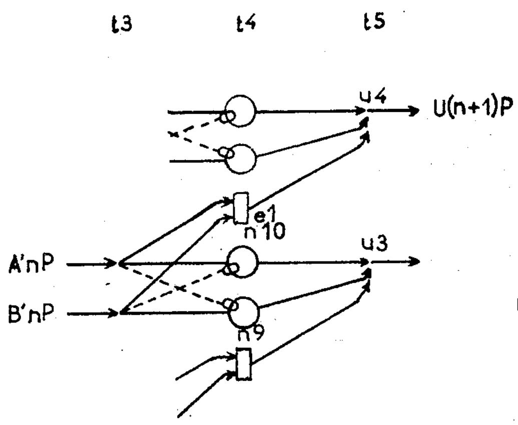
FIG. 4 shows an adder circuit for separately adding the positive or negative parts of two RAB numbers as indicated by block ADP or ADN in FIG. 1.

Logical "and" networks, or intersectors, are herein shown as small blocks designated by the letter *e* followed by a numerical suffix; cf. e.g. the and-network *e1* in FIG. 4.

Logical "or" networks, or union networks, are indicated simply by the meeting of their two or more input lines, provided with arrowheads, and their single output; cf. the two two-input or-networks shown at the right of FIG. 3. Whene explicitly referred to in the specification, they are designated by the letter *u* or U followed by a number, as the or-networks *u3* and *u4* in FIG. 4.

Logical "not" networks, or inhibitors, are shown as rings having a digital input, an output, and an inhibitor input (shown in dotted lines), and are desigated by *n* followed by a number, cf. inhibitor *n1* in FIG. 2. An inhibitor network, be it recalled, operates in such a way that a pulse applied to its digital input (full-line input) is transmitted unchanged to its output unless a pulse is simultaneously present on its inhibitor input (dotted-line input).

Delay networks, which serve to ensure proper synchronism between signals travelling over various paths by imparting delays of one or more clock-pulses where required, are shown as arrowheads at the point of delay. See for example the three delay networks at the left of FIG. 2.

Figure 17:
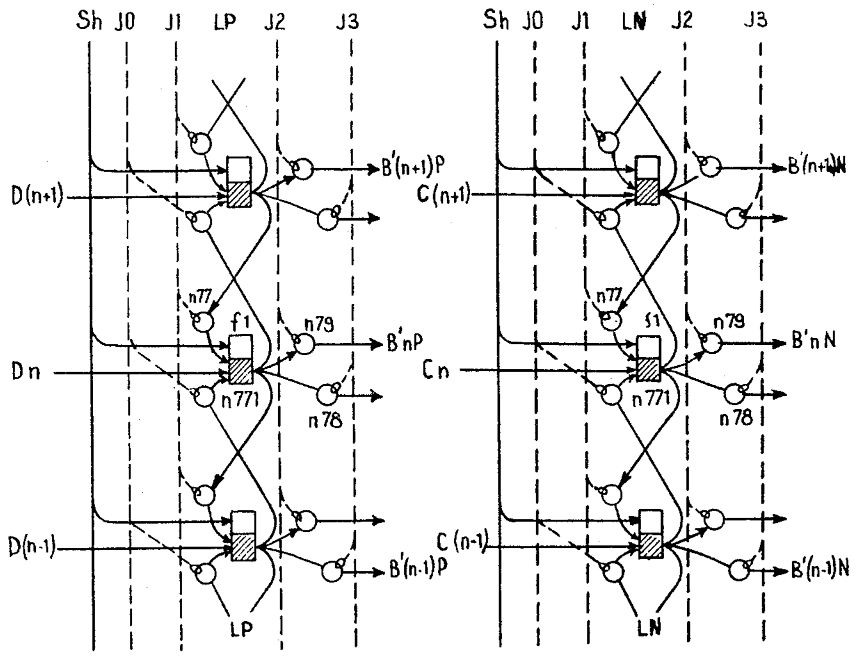
FIG. 17 shows stepping memory circuits.

Bistable storage elements or flipflops are illustrated as partly cross-hatched boxes, see e.g. flipflop *f1* in FIG. 17. The flipflops here shown are of the type having two inputs (setting and resetting) and a single output (the set output) and in which a pulse applied to the setting input energizes the single output until the flipflop is reset by application of a pulse to the reset input.

It will be understood that all of the above components may assume any of the extremely diversified physical forms generally usable for comparable purposes in digital computers, as for example (by no means an exclusive example) ferrite cores. It should also be understood that the clock pulses serving to ensure the synchronic operation of the various circuits are applied to the various components enumerated above through means that have not been shown except where necessary or desirable for clarifying the operation of a circuit.

A final symbolic convention used in many of the drawings is that conductors conveying information signals representing positive digits are drawn in heavy solid lines while conductors conveying signals representing negative digits are drawn in lighter solid lines; and conductors conveying inhibiting signals are shown as dotted lines.

FIG. 2 shows three of a set of parallel A input lines into coder TBA–A of FIG. 1, which lines are designated $A(n-1)$, A$n$ and $A(n+1)$, and each of which is adapted to carry a "bivalent" binary signal, such as presence or absence of a predetermined voltage, to represent the related binary digit 1 or 0 of a related numerical position in the multi-digit binary number A, as will be readily understood, applied thereto at the arbitrary clock time $t0$. Considering the line A$n$, this is applied to the main input of not-circuit $n1$ the output of which is connected to output line A$n$N. This constitutes the $n$-stage output line for the $n$th binary digit of the negative output number, and forms part of the parallel set of lines generally designated A'N in FIG. 1. Input line A$n$ is also applied as the main input of a not-circuit $n4$ whose output constitutes the positive output line $(A(n+1)P$ for the $(n+1)$st digit of the positive output number and forms part of the parallel set of output lines generally designated A'P in FIG. 1. Further, input line A$n$ provides the inhibitor inputs for a not-circuit $n2$ the output from which constitutes output line A$n$P, and for a not-circuit $n3$ the output from which constitutes output line $A(n+1)N$; the last mentioned two output lines respectively carry the $n$th digit of a positive output number appearing in A'P of FIG. 1, and the $(n+1)$st digit of a negative output number appearing in A'N of FIG. 1. The connections just described for the input line A$n$ of the $n$th stage are identically repeated for all the other input stages (except possibly for the first and some of the last stages as will be later described), and this has been indicated by showing partially such connections adjacent to stage input lines $A(n-1)$ and $A(n+1)$.

In operation an input signal over line A$n$ representing a positive 1 of binary value $2^n$, if such signal is not accompanied by a signal on lines $A(n-1)$ and $A(n+1)$ representing positive 1's of values $2^{n-1}$ and $2^{n+1}$, results in the production of a signal over output line $A(n+1)P$ to represent a digit $2^{n+1}$ in the positive output number, and the production of a signal over output line A$n$N to represent a digit $-2^n$ in the negative output number, in accordance with the conversion rules given hereinabove. However, should input signals occur simultaneously on input lines A$n$ and $A(n-1)$, the action of not-circuits $n1$ and $n2$ will prevent the occurrence of an output on either of the positive and negative output lines A$n$P and A$n$N. Similarly the simultaneous occurrence of input signals on A$n$ and $A(n+1)$ would, through not-circuits $n3$ and $n4$, inhibit all output information on the $(n+1)$-stage output lines. Thus it is seen that in accordance with the conversion rules stated, any group of adjacent 1's in the input number will result in the delivery of a negative digit $\bar{1}$ in the output number position corresponding to the lowermost digit 1 of the input number group and a positive digit 1 in the output number position next higher to the position corresponding to the highermost digit 1 of the input number group, with 0's at all intervening positions of the output number.

FIG. 3 shows an embodiment of sign selector IS–A (or IS–B) of FIG. 1. Only the typical pair of output lines A$n$P and A$n$N from the coder of FIG. 2 are shown, since the construction of the remaining stages will be immediately intelligible from the ensuing description. Line A$n$N is applied to the digital inputs of respective not-circuits $n5$ and $n6$ and line A$n$P is applied to the digital inputs of respective not-circuits $n7$ and $n8$. Not-circuits $n6$ and $n7$ have their inhibitor inputs supplied from the addition-command line ADD and not-circuits $n5$ and $n8$ have their inhibitor inputs supplied from substraction-command line SST. The outputs from not-circuits $n5$ and $n7$ are combined in an or-circuit U1 whose output provides the negative output line A'$n$N of stage $n$, and similarly the outputs from $n6$ and $n8$ are combined by an or-circuit $u2$ whose output is the positive output line A'$n$P of the same stage. It will be seen that a command pulse applied through line ADD will prevent the transfer of information from A$n$P to line A'$n$N and from A$n$N to line A'$n$P but will not prevent such transfer from A$n$P to line A'$n$P, and from A$n$N to line A'$n$N, so that the digits of the output number will then be similiar in sign to those of the input number; while a command pulse applied through line SST to circuits $n5$ and $n8$ will have the reverse effect thereby changing the sign of all the digits in the output number as compared to those in the input number.

FIG. 4 illustrates an embodiment of either of the adder units, such as positive adder ADP, of FIG. 1, for performing parallel addition on a pair of RAB or NAB numbers without carry transfer. In each parallel stage of the device, such as the $n$th stage shown in full, the input line B'$n$P carrying the $n$-stage digit of the positive B number is applied to the digital input of a not-circuit $n9$ and to one input of an and-circuit $e1$; similarly input line A'$n$P is applied to the digital input of a not-circuit $n10$ and to the other input of and-circuit $e1$. Not-circuit $n9$ has its inhibitor input connected to line A'$n$P and not-circuit $n10$ has its inhibitor input connected to line B'$n$P. The outputs from both not-circuits $n9$ and $n10$ form two of the inputs to a three-input or-circuit $u3$, the third input whereof is provided by the output from an and-circuit corresponding to $e1$ in the next-lower stage of the device, and the output from $u3$ is the output line U$n$P carrying the $n$-stage digit of the positive sum number. The output from and-circuit $e1$ is similarly applied to the third input to an or-circuit $u4$ corresponding to $u3$ in the next-higher stage having the output line $U(n+1)P$.

It will be seen that each stage of the device resembles a conventional binary "half-adder" stage, serving to provide a 1-output in the same stage as the input when only one of the two addend numbers has a 1 at said stage, and serving to provide a 1-output in the next higher stage when both added numbers contain a 1 at the stage considered. It is noted that this addition process only requires two clock periods ($t4$ and $t5$).

Figure 5:
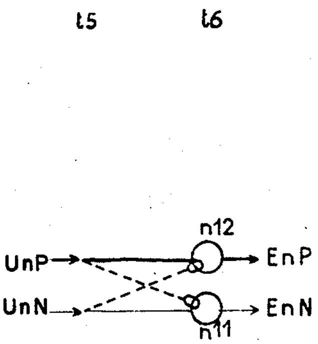
FIG. 5 shows a suppressor circuit for canceling opposite-sign digits as indicated by block SP in FIG. 1.

FIG. 5 shows a typical stage of suppressor circuit SP (FIG. 1), serving to cancel any 1 and $\bar{1}$ digits occurring at corresponding positions or stages of the positive and negative numbers. Negative input line U$n$N is applied to the digital input of a not-circuit $n11$ and to the inhibitor input of not-circuit $n12$. Positive input line U$n$P is applied to the digital input of $n12$ and to the inhibitor input of $n11$. The outputs from $n11$ and $n12$ thus constitute the output lines E$n$N and E$n$P carrying the $n$th digits of the reduced positive and negative numbers as earlier explained. In operation, when both inputs U$n$N and U$n$P carry 1 digits, both outputs are suppressed; when only one input carries a (positive or negative) 1 digit, a 1 output is present on the output line of corresponding sign. It will be noted that the complete addition of two multi-digit binary numbers has required the six clock periods $t0$–$t6$.

FIG. 6 shows three adjacent stages of a circuit such as the transcriber unit TR of FIG. 1, which serves to convert two positive and negative numbers EP and EN which constitute positive and negative parts of an algebraic-binary (AB) number into the positive and negative parts of an algebraic-binary (RAB) number wherein the basic condition specified earlier is satisfied, i.e. absence of units of common sign at adjacent binary positions. When such a transcriber unit is included in an adder system of the invention of the type above described, as it is shown included in FIG. 1, then the system will be usable for totalizing in succession any desired amount of binary numbers. Thus, having added the first pair of addend numbers A and B, to obtain the positive and negative parts EP and EN at the outputs from the suppressor unit SP, these last two numbers are passed through transcriber unit TR where they are converted into the respective positive and negative numbers FP and FN satisfying the afore-specified condition; these last numbers are then reapplied e.g. to the positive and negative "A" inputs of adders ADP and ADN, as shown, to be added to a further number C, applied by way of input B for example, and so on repeatedly.

In accordance with the theory of the "transcribing" process explained earlier herein, the operation of the transcriber device of FIG. 6 involves three main steps, each requiring one clock period to perform. The logical circuit design of the device of FIG. 6 will be best explained by a sequential description of this three-step process.

In the first step, at time $t7$, the positive number EP is converted into its "NAB" equivalent in a first section of the device which comprises a series or group of not-circuits substantially similar to the coder described above with reference to FIG. 2, since it performs a similar function. However, in the present instance there is the further requirement that this initial coding section comprises in each binary stage, negative input and output lines in addition to the positive input and output lines. The negative output line of said first section must carry a 1 signal whenever the corresponding-stage negative input line (such as E$n$N) has a $\bar{1}$-signal, except where such a $\bar{1}$ output signal would occur simultaneously with a 1-signal carried by the positive output line from the same stage, as resulting from the application to the not-circuit such as $n16$ feeding the said positive output line, of an input from the positive input line such as $E(n-1)P$ of the preceding stage. Fulfilment of this condition is simplified by the fact that owing to the operation of the suppressor unit SP previously described no two input lines such as E$n$P and E$n$N of a given stage of TR can ever simultaneously carry a 1 and a $\bar{1}$ digit, respectively. Because of this it is simply necessary to connect each negative input line such as E$n$N with the digital input of the not-circuit $n15$ supplying the negative output line of said first section, and with the inhibitor input of the not-circuit $n16$ supplying the positive output line of said section, as shown. In the next step, at time $t8$, any negative output digit issuing from the not-circuit such as $n15$ is stored in an and-circuit $e2$ whenever a positive digit is present on the positive output line from the preceding stage, i.e. the output of not-circuit $n14$, for which purpose this output is connected to the second input of and-circuit $e2$. The necessity for thus storing the $\bar{1}$ digit under these circumstances will appear from the description of the next, third, step of the process. Simultaneously the $\bar{1}$-signal from the output of $n15$ is applied to the input of a not-circuit $n18$ inhibitable by the output from not-circuit $n14$ representing a 1-digit in the preceding stage. This is necessary because, as will be recalled, the process requires that a $\bar{1}$ digit in any stage must not be converted into its NAB equivalent whenever there is a 1 digit occurring in the preceding stage.

In the third step, at time $t9$, any remaining $\bar{1}$ signal present on the negative output lines from the second section, i.e. on the outputs from not-circuits such as $n18$, are converted to their NAB equivalents. This conversion is performed by means of a coder section entirely similar to the first coder section described above, except that the negative input lines for this last coding section have functions similar to those of the positive input lines for the first coding section and vice versa, since in the third section it is the negative digits that require coding into NAB form. Moreover, any negative digit information stored in and-circuits such as $e2$ at the preceding clock time are now delivered back to the inputs of the not-circuits such as $n19$ supplying the negative output lines. This ensures that all $\bar{1}$'s of the input number occurring at positions next higher to a 1, are passed unaltered through the transcriber device as required by the process. It is noted in this connection that a not-circuit such as $n19$ is always free to receive a $\bar{1}$ signal from the related and-circuit such as $e2$, since the other input to this not-circuit is from the not-circuit such as $n17$ relating to the preceding binary stage, and would have to be applied to this last not-circuit at the preceding clock period $t8$, i.e. at the same time as the positive 1 signal is applied to the and-circuit $e2$; this cannot occur since any given binary stage cannot simultaneously carry a 1 and a $\bar{1}$ on its positive and negative lines respectively, at the input to the second section of the device, as will be evident from what has occurred before.

The output lines from the device, such as lines F$n$P and F$n$N for the $n$th binary stage, thus carry binary information as exemplified by Equations 24 and 25 above representing the positive and negative parts of a RAB number having no digits of similar sign in adjacent positions. Thus, to sum up the output line F$n$P may carry a 1 signal resulting either from the passage of a positive 1 digit from the preceding $(n-1)$th binary stage as effected by $n16$ and $n20$, or from the conversion of a negative $\bar{1}$ digit from the $n$th stage through $n15$, $n18$ and $n20$. The output line F$n$N may carry a negative $\bar{1}$ signal resulting either from the passage of a negative $\bar{1}$ digit from the preceding $(n-1)$th stage through $n13$, $n17$ and $n19$, or from the passage of the $\bar{1}$ digit stored in $e2$ as derived from the not-circuit $n15$ of the $n$th stage.

There has thus been described with reference to the block diagram of FIG. 1 and the logical circuit diagrams of FIGS. 2 to 6 a first form of adder system according to the invention whereby two or more binary numbers may be added without carry transfer. The operation of this system is based on a process the theory of which was described prior to the description of FIG. 1. There will now be described an alternative process for performing addition according to the principles of the invention and an adder device for performing this process. An advantageous feature of this alternative process is that it does not require a preliminary coding of the addend binary numbers into algebraic binary form, so that a further saving in computing time and equipment is achieved.

This preferred adding process of the invention is based on the observation that, given two multi-digit binary numbers to be added, a pair of 1 digits in corresponding positions of the respective numbers produce a single 1 digit in the result number at a binary position displaced one place leftwards, and that similarly, in the process of converting a binary number into a NAB number according to the invention, a 1 digit likewise produces a 1 digit in the final number, that is displaced one place leftward.

Let us then consider the two binary numbers A and B of the previous example. The set of binary positions of the pair of numbers can be divided into two classes: the class of positions in which a 1 digit is present in only one of the numbers, and the class of positions in which a 1 digit is present in both the numbers. From the first class we then derive a binary number E such that it contains a 1 digit at each binary position corresponding to a position in which either A or B contains a 1 digit; and from the second class we derive a binary number F such that it contains a 1 digit at each binary position next higher to a position at which both A and B have 1 digits. Clearly the sum $E+F$ is equal to the sum $A+B$. The four numbers A, B, E and F are written below:

$$A=\ \ 101001111001$$
$$B=1001100011011$$

$$E=1100101100010 \qquad (27)$$
$$F=\ \ \ 10000110010 \qquad (28)$$

The E number is next coded into algebraic binary (NAB) form by the coding process of the invention. In the resulting coded E number, it is easily seen that only negative $\bar{1}$ digits can occur at positions corresponding to positions at which F contains 1 digits, and that wherever such coincidences actually do occur, the coincident 1 in the F number must necessarily have a zero to the left of it. This results from the fact that a $\bar{1}$ in the NAB-coded E number corresponds to a position at which only 1 of the original A and B numbers contained a 1, so that if F has a 1 in that same position such 1 can only result from a carryover from a preceding position. The F number and the NAB-coded E number are written below:

$$E=10\bar{1}01\bar{1}10\bar{1}001\bar{1}0 \qquad (29)$$
$$F=\quad 10000110010 \qquad (28)$$

By now canceling opposite-sign digits in corresponding positions of E and F, we obviously do not alter their sum. In the resulting sum number $V=E+F$, there can be no negative digits $\bar{1}$ in adjacent positions since such $\bar{1}$'s all result from the NAB-coded number E, but there may of course be 1's in adjacent positions, since the 1's result both from E and from the ordinary binary number F. The reduced E and F numbers are written below, followed by their sum $V=E+F$. This sum is clearly equivalent to the desired sum $A+B$.

$$E=10\bar{1}01\bar{1}10000100 \qquad (30)$$
$$F=\quad 10000010000 \qquad (31)$$
$$V=E+F=10\bar{1}11\bar{1}10010100 \qquad (32)$$

The number V has the positive and negative parts D and C as follows:

$$D=10011010010100 \qquad (33)$$
$$C=\quad \bar{1}00\bar{1}0000000 \qquad (34)$$

It will be noted that although this number V is differently coded from the number U found as the sum of A and B in the first process (see Equation 19, the two values are equivalent as can be verified by converting both V and U to decimal. Thus the two given numbers A and B have been added without carry transfer. Moreover, the process of addition just described permits of direct sequential addition of more than two numbers (what is here called totalization). Assume for example a further binary number G is to be added to the number $V=A+B$. It is simply necessary to cancel corresponding positive and negative digits as between G and the negative part E of V respectively and thereafter add the remaining portion of G to the positive part D of V by the identical process as described above.

Figure 7:
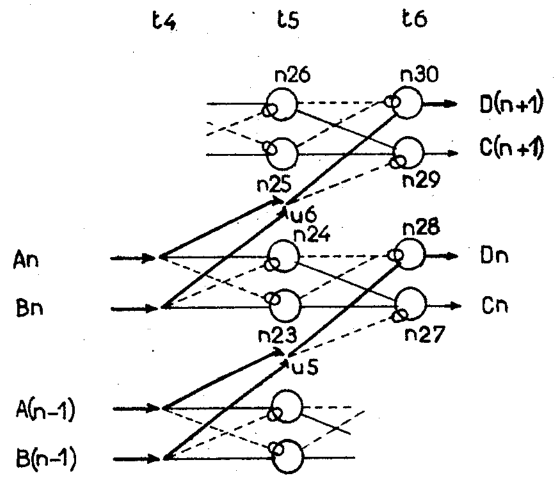
FIG. 7 shows circuitry for adding a pair of ordinary binary numbers of similar sign according to a modified method of the invention.

FIG. 7 illustrates part of an adder device designed to operate according to the process just described. Considering the $n$th stage of the set of parallel input lines for both addend numbers A and B, which stage comprises the pair of lines A$n$ and B$n$, it will be seen that if there is a 1-digit on either one, and only one, of these lines, such signal is passed by way of not-circuit $n23$ or $n24$ and the common output not-circuit $n27$ to the output line C$n$ unless $n27$ is inhibited as will later appear. The parallel set of output lines of which C$n$ forms part carry the negative digits of the final all-negative C number as exemplified by Equations 34 above. However, if both input lines A$n$ and B$n$ carry 1-signals both $n23$ and $n24$ are inhibited by the "mutual-inhibiting" cross-connections shown and no output is passed to line C$n$. Further, when either one or both of input lines A$n$ and B$n$ carry 1-signals, an output 1-signal is transmitted from an or-circuit $u6$ to which both said input lines are applied, and thence through a not-circuit $n30$ to the output line $D(n+1)$ of the next higher stage unless $n30$ is inhibited as will later appear. The parallel set of output lines of which $D(n+1)$ forms part carry the positive digits of the final all-positive D number as exemplified by Equation 33 above.

Thus with the elements so far described, it is seen that when there is in the $n$th stage a 1 digit in only one of the two input numbers A and B, a $\bar{1}$-digit would appear at the $n$th stage of the C number and a 1-digit would appear at the $(n+1)$th stage of the D number, i.e. the C and D output lines of stages $n$ and $(n+1)$ would carry the digits representing the NAB-coded "E" number as exemplified by Equation 29; and it is also seen that when there are in the $n$th stage 1 digits in both input numbers A and B, a 1-digit would appear in the $(n+1)$th stage of the D number, i.e. the D output lines of both said stages would carry the digits representing the "F" number exemplified by Equation 28.

It now only remains, in order to ensure that the C output lines will represent the C number of Equation 34 and that the D output lines will represent the D number of Equation 33, to cancel any output signals that would otherwise appear simultaneously on both C and D output lines of a particular stage. For this purpose, as shown, the not-circuits $n27$ and $n29$ supplying the C outputs of the related stages are inhibited by the outputs from the related or-circuits $u5$, $u6$ supplying (through $n28$, $n30$) the D output lines; and the not-circuits $n28$ and $n30$ are inhibited by the outputs from the related not-circuits $n23$ and $n24$, and $n25$ and $n26$, respectively supplying the C-output lines.

In sum, the device of FIG. 7 converts the two input addend numbers A and B into output numbers C and D which are the respective negative and positive parts of an algebraic-binary number which is the desired sum of A and B, by the following process: All single 1-digits in a given binary position of either addend number are combined into a single binary number and this is coded in NAB form; all double 1-digits occurring in a particular binary position of both addend numbers are converted into a binary number having a 1-digit displaced one binary place leftward from the said position; and all opposite-sign units occurring in coinciding corresponding positions of the two resulting numbers are mutually canceled, it being noted that any such coincidence between opposite sign digits of the two numbers is the result of an interference between a 1 digit displaced to that position from the next-lower position of either one or both of the addend numbers, with a $\bar{1}$ digit produced by the NAB-coding of a 1 digit present in that position in a single one of the addend numbers.

Figure 8:
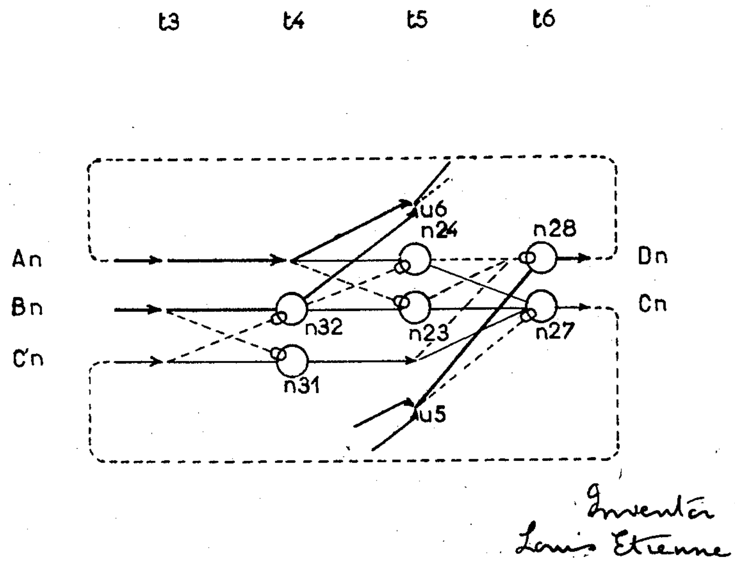
FIG. 8 shows a modification of FIG. 7 for the sequential addition of more than two numbers.

FIG. 8 illustrates a modification of the adder device of FIG. 7 whereby a number appearing at the output lines C and D as the sum of a pair of input numbers may be reintroduced into the input for addition with a further number, and so on repeatedly. Only one complete binary stage of the device is shown. The positive output line D$n$ is taken back, by way of the dash-line loop indicated, to the input line A$n$ of the device. The negative output line C$n$ is taken back by way of the loop similarly indicated in dash lines, to a third input line C'$n$ which, as will be understood from the foregoing, carries negative digits only. It should be noted that the dashed-line inputs to lines A$n$ and C'$n$ in FIG. 8 may, if desired, be derived from the D$n$ and C$n$ output lines, respectively, of another similar adder device rather than from the same adder device as shown. Input lines A$n$ and C'$n$ in a given stage will not at any time simultaneously carry digital information (1 and $\bar{1}$ respectively). Lines B$n$ and C'$n$ are applied to the respective not-circuits $n32$ and $n31$ each having an inhibitor input from the other input line, as shown, so that opposite-sign digits present on B$n$ and C'$n$ are mutually canceled out. The output of not-circuit $n32$ is then connected in a fashion exactly similar to the connections of the input line of FIG. 7, as will be immediately apparent from a comparison of the two figures in which corresponding components have been similarly designated. As to the output from not-circuit $n31$ of the additional C'$n$ input line, this is connected, by way of a delay element for taking up clock period $t5$, to an additional (third) digital input of the C$n$ output not-circuit $n27$, as well as to an additional (third) inhibitor input of the D$n$ output not-circuit $n28$. In this way any $\bar{1}$ digit present at C'$n$, provided it does not coincide with a 1 digit on B$n$, is passed through $n31$ to $n27$ and, provided it does not then coincide with a 1 digit attempting to pass from the preceding $(n-1)$th stage through $u5$ and $n28$ to the D$n$ output line, the said $\bar{1}$ digit will appear at the C$n$ output. However should the $\bar{1}$ digit from C'$n$ reach $n27$ at the same time as a 1 digit is being passed to $n28$, then both output signals cancel out by the mutual inhibitor connections shown. Note that the presence of three inhibitor inputs to not-circuit *n*28 is not objectionable since it will be evident that only one of the three can at any time be energized, owing to the cross-inhibition present between *n*23 and *n*24, and the cross-inhibition present between *n*31 and *n*32. In other respects the device of FIG. 8 operates similarly to that of FIG. 7.

The adder device of FIG. 7 and totalizer device of FIG. 8 are extremely advantageous in that each addition performed therewith requires no more than three clock periods. However, they both have the limitation that each input number such as A and B must always retain a fixed sign; in other words they are not directly adapted for subtraction. A device adapted to be connected ahead of the input to the totalizer of FIG. 8 in order to enable algebraic addition of a series of numbers to be performed regardless of sign, i.e. both addition and subtraction, is illustrated in FIG. 9.

Figure 9:
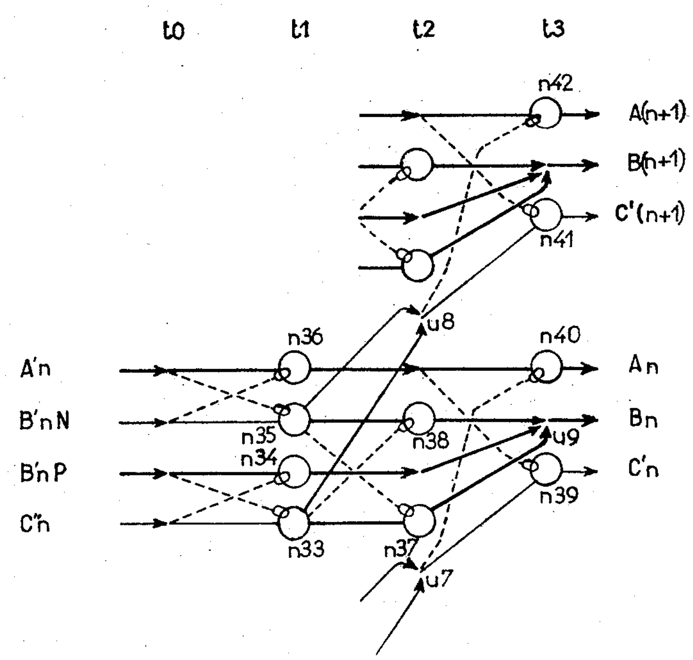
FIG. 9 shows further circuitry for use in conjunction with the circuitry of FIG. 7 or 8.

Each stage of the device of FIG. 9 has two pairs of input lines, one pair including positive line A'*n* and negative line C''*n*, and the other pair including positive line B'*n*P and negative line B'*n*N. The stage has three output lines, positive line A*n*, positive line B*n* and negative line C'*n* adapted respectively to be connected to the similarly-designated input lines of FIG. 8. Further, the output line D*n* of FIG. 8 is adapted to be connected back to the input line A'*n* of FIG. 9 and the output line C*n* of FIG. 8 is adapted to be connected back to the input line C''*n* of FIG. 9. Thus it is seen that only the input pair B'*n*P and B'*n*N is free to receive a new addend number during the totalization of a series of numbers, while the input pair A'*n* nad C''*n* serves to reintroduce the precedingly computed sum constituting the augend in the next additive process. It is assumed that the positive and negative parts of a B number entered through the input lines such as B'*n*P and B'*n*N are in reduced form, i.e. do not contain opposite-sign digits in any common binary position, this being achieved if necessary by first passing them through a suppressor circuit as in FIG. 5. The positive and negative parts entered through A'*n* and C''*n* are similarly in reduced form.

In an initial section of the circuit of FIG. 9 the mutual cancellation of opposite-sign digits in all of the input lines is first completed by passing the signals through the pair A'*n* and B'N through a suppressor circuit including the not-circuits *n*35 and *n*36, and similarly passing the signals through the pair B'*n*P and C''*n* through a suppressor circuit *n*33, *n*34. Thus at the output from these circuits (time *t*1) the four input lines will either be carrying a single (positive or negative) digit, or a pair of similar-sign (positive or negative) digits. If the input digit(s) is (are) positive, a positive digit passed from line A'*n* through *n*36 is applied to the output A*n* through a not-circuit *n*40 unless inhibited by means later described and/or a positive digit passed from line B'*n*P through *n*34 is applied to the output B*n* through a delay element and an or-circuit *u*9.

If on the other hand the input digit(s) remaining after reduction is (are) negative, in which case it appears (or they appear) at the outputs of *n*35 and *n*33, such negative digits are handled in a manner similar to the positive input digits appearing at the input to the device of FIG. 7. That is, if there is a single negative digit it is converted to a positive digit on output B*n* and a negative digit on output C'(*n*+1) of the next higher stage; while if there are two negative digits they are converted to a single negative digit on output C'(*n*+1); and simultaneously opposite-sign digits on the three output lines A*n*, B*n*, C'*n* are canceled. To achieve this, there is provided an arrangement generally similar to that of FIG. 7, including the not-circuits *n*37 and *n*38, or-circuit *u*8 and not-circuit *n*39 (supplied from *u*7 corresponding to *u*8 in the next-lower stage). Thus, if there is a single negative digit from either *n*35 or *n*33, this is passed through

*n*38 or *n*37 to or-circuit *u*9 to positive output B*n*, and simultaneously it is passed through *u*8 and not-circuit *n*41 corresponding (in the next higher stage) to not-circuit *n*39, to higher-stage negative output line C'(*n*+1). If there are two negative digits from both *n*35 and *n*33, these are not passed to B*n* owing to mutual suppression by means of not-circuits *n*37 and *n*38, but are passed as a single negative digit through *u*8 and *n*41 to C'(*n*+1). Finally any opposite-sign digits present in lines A*n* and C'*n* are mutually canceled by inhibition at *n*40 and *n*39 respectively from *u*7 and *n*36 as shown. As to the mutual cancellation between any opposite sign digits on B*n* and C'*n*, this is effected in the initial section of the device of FIG. 8 as was already described.

The combined devices of FIGS. 9 and 8 constitute a complete totalizer device whereby ordinary binary and/or algebraic binary numbers regardless of sign can be totalized, i.e. repeatedly added, with each addition requiring only six clock periods in all.

My invention also includes improved multiplier devices. Since any multi-digit multiplying process must generally involve plural addition of partial products, it is clear that the improvement accomplished according to the invention in making possible the parallel addition of binary numbers without carry transfer, will achieve corresponding advantage in any multiplication process wherein such partial product addition would be performed by the adding means of the invention. I shall here describe one type of such multiplying process, wherein the partial products are obtained by a method first described by the Indian mathematician Brahmagupta in the fifth century A.D. and introduced to medieval Europe through Arabic literature. This method per se forms no part of the invention. The invention does however comprehend the combination of Brahmagupta's multiplication method with the improved adding methods herein described for the purpose of providing improved binary multiplier devices capable of achieving considerably higher over-all operating rates than those currently attainable in automatic computers.

Brahmagupta's multiplying process is best explained by an example. Consider the product of decimal factors $$213 \times 123 = 26199$$

where the factors have purposely been so selected, for the sake of clarity, that none of the partial products involves a carry. The two factors are written along adjacent sides of a square chart (see below), with the highest-significance digit of each factor being placed at the top. The sides of the square are preferably drawn diagonally to the sides of the pages, as shown. The square is then divided into a checker pattern by two sets of lines respectively parallel to the aforementioned two sides and each line extending from a related digit of a corresponding one of the two factors. At each crossing between two lines of the respective sets we write the partial product derived from both factor digits relating to these lines. Then add the partial products appearing on each horizontal line, starting with the bottom (which contains only a single partial product) and moving upwards, carries being taken into account. The resulting number when read vertically downwards is the desired product.

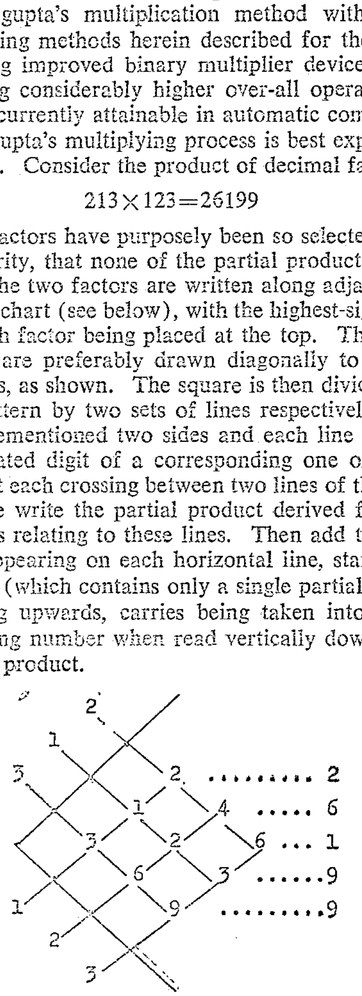

An entirely comparable multiplying process is applicable also in binary numeration. In fact the process is then considerably simplified since each partial product will then comprise only one digit being equal to either 1 or 0. Further, the binary numbers readable along each line of a set parallel to a side of the square side will either be made up of all zeros if the multiplication factor digit controlling that line is a zero, or will be the same binary number as the multiplication factor written along the related side of the square, if the said controlling digit is a 1. This will be made clear by the following example relating to the product:

$$101101\times110101=100101010001$$

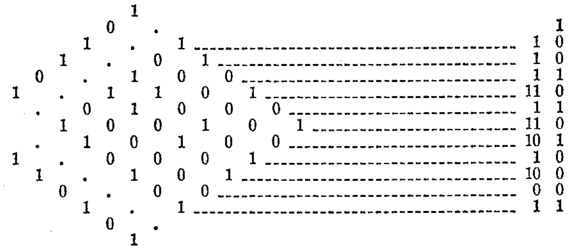

Of the two columns at the right of the above chart, the left-hand column contains the sum of all the partial products in the related horizontal line, while the last column on the right shows the final product number as obtained after the carries in the first column have been effected starting with the bottom. It will be evident moreover that the product number can be obtained by totalizing the partial products according to any convenient scheme, provided the relative binary "weights," or binary significance of the partial products in the final product are correctly taken into account. For example, such totalization may be effected by adding all the binary numbers appearing along the lines parallel to a selected side of the square, or by adding all the binary numbers appearing in successive pairs of vertical columns of the chart, as will presently appear.

Figure 10:
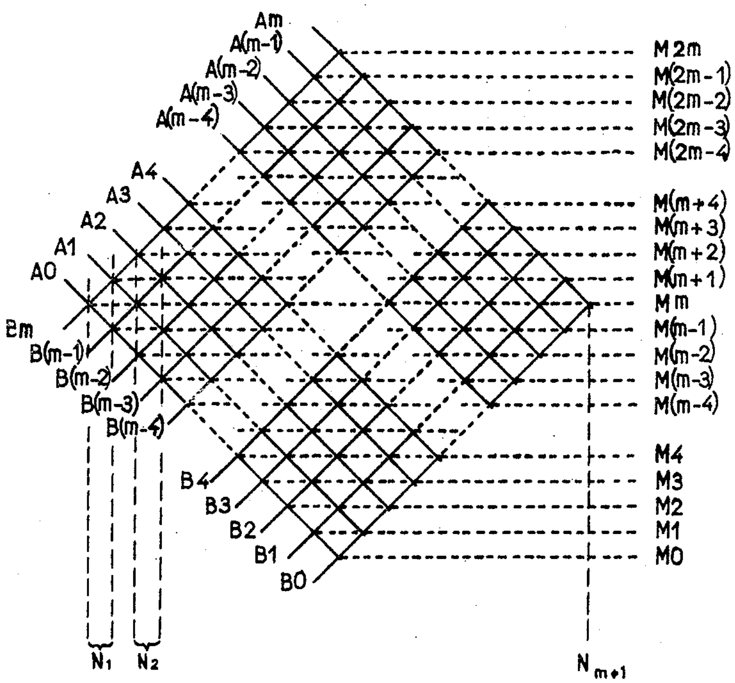
FIG. 10 shows a matrix circuit forming part of a multiplier circuit in accordance with the invention.

FIG. 10 shows the schematic of a matrix network embodying a binary Brahmagupta multiplication chart as used in a multiplier device of the present invention. The solid lines of the chart are electric conductors and are arranged in two sets of parallel lines A and B, respectively. At the crossing between any pair of lines belonging to different sets the two conductors are connected to the respective inputs of a related and-circuit positioned at that crossing. These and-circuits have been omitted from the chart in the interests of clarity. All the lines of the "A" set, such as A0, A1 . . . $A(m-1)$, A$m$ are connected to the output stages of a first multi-stage binary memory in which an $m$-digit A number is stored, A being one of the two factors of the multiplication. Similarly all the "B" lines such as B0, B1 . . . $B(m-1)$, B$m$ are connected to another binary memory storing an $m$-digit B number, B being the other factor of the multiplication. A0 and B0 carry the least-significant digits of the respective factors. The total number of and-circuits is $(m+1)^2$. The and-circuit positioned at the crossing e.g. between lines A$i$ and B$j$ is termed $e(i, j)$.

Assuming the respective digits of the two factors A and B are applied in parallel to the respective sets of A and B lines at an initial clock time $t0$, then at time $t1$ the partial product of any pair of factors digits of binary significance $i$ and $j$ respectively, will be stored in the and-circuit $e(i, j)$ as the absence (0) or presence (1) of an output from the and-circuit. The binary significance or weight of the partial product in the partial product number will be $2^i\times2^j=2^{i+j}$, where $2^i$ and $2^j$ are the binary weights of the respective input factor digits. It is readily seen that the partial products stored in the and-circuits appearing on a common horizontal (dotted) line of the chart all have the same binary weight, since the sum $(i+j)$ is constant along any such horizontal line. Hence the outputs from all the and-circuits of a common horizontal line are connected in common (e.g. through an or-circuit not shown) to the corresponding stage (stage $i+j$) input of a totalizer M.

The totalizer used may be of either of the two main types of the invention as described with reference to FIGS. 1 to 6, and FIGS. 7 to 9. At any given time the totalizer of course, is only able to add a single addend number of an augend number. In order to minimize the over-all time required to complete summation of the single-digit partial products, the latter are grouped into a minimum number of multi-digit numbers which are then successively added in the manner previously explained. Such grouping according to a preferred form of the invention may be effected in the following way.

Considering a pair of adjacent vertical columns of and-circuits in the matrix, it is seen that one vertical column contains partial product digits of even binary weights in the final product, while the other contains partial product digits of the intervening odd weights. Thus all the digits contained in such a pair of adjacent vertical columns can be regarded as constituting a single complete multi-digit binary number. Starting with the left-hand corner of the matrix, the three-digit number stored in the and-circuits of the first pair of vertical columns will be called N1, the seven-digit number stored in the second pair of columns will be called N2, and so forth. Since the total number of vertical columns in the square matrix is of necessity odd regardless of its size, such number being equal to $(2m+1)$, it is seen that the last binary number $N(m+1)$ to be considered here is the single-digit number stored in the single and-circuit at the right-hand corner of the matrix. Thus, by introducing the successive numbers N1, N2, . . . $N(m+1)$ into a single totalizer device according to the invention, the totalizing process will be completed, and the matrix cleared of the binary information stored in it, in a total of $(m+1)$ adding operations.

Figure 11:
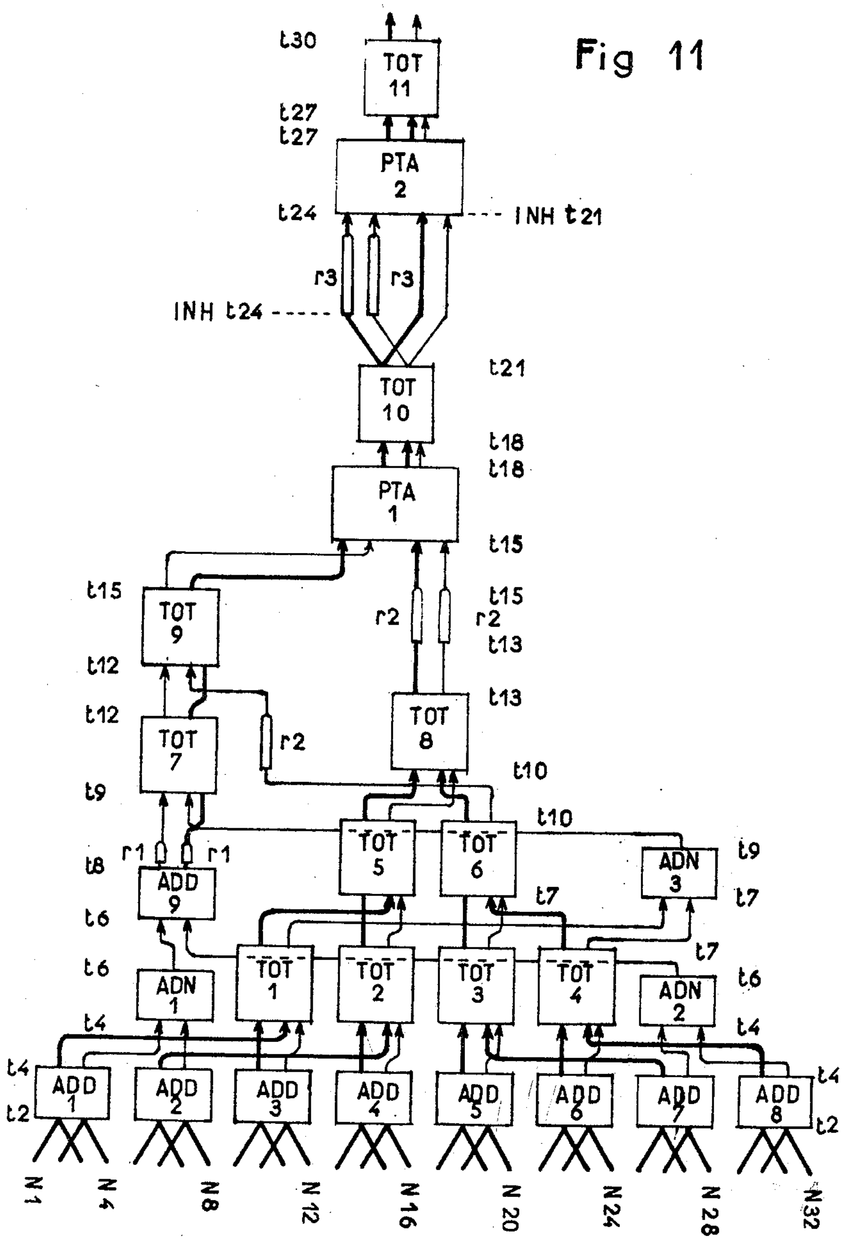
FIG. 11 is a functional diagram of the partial-product adding means of the multiplier.

A considerable gain in multiplying time can be achieved over the procedure mentioned above as using a single totalizer device, by the simultaneous use of more than one adder and totalizer devices as will be now described with reference to the block diagram of FIG. 11. The diagram shows various of the devices of the invention described above with reference to FIGS. 4, 7, 8 and 9 connected up into an integrated multiplication product summing system whereby over-all multiplication time has been reduced to a minimum while still requiring only a comparatively small amount of equipment especially in view of the inherent simplicity of each of the component (adding and totalizing) devices of the invention.

In describing this system it is assumed that the multiplier matrix of FIG. 10 with which it is to be used includes 32 lines in either set, i.e. each multiplication factor may be a 32-digit binary number $(m+1)=32$.

A first section of the system comprises the eight adders ADD1 to ADD8 each of which is of the type shown in FIG. 7, i.e. is able to receive a pair of positive binary input numbers over a parallel set of input lines and puts out an algebraic binary number expressed as a pair of positive and negative part numbers over two sets of output lines. The digital capacity of each of these adders is selected to correspond with the maximum size of the sum number it will have to put out, and the same will hold true for all of the other adder and totalizer devices to be described in connection with this system. Each of the adders ADD1 to ADD8 is connected to receive at its input a first pair of "N" numbers from the matrix circuit of FIG. 10 at a first clock time, i.e. time $t2$ since it has been shown that all of the partial-product information has been stored in the matrix and-circuits at time $t1$, and a second pair of N numbers from the matrix circuit three clock periods later, i.e. at time $t5$. Specifically, adder ADD1 receives the pair N1 and N2 at $t2$ and the pair N3 and N4 at $t5$; more generally adder ADD$i$ receives $N(4i-3)$ and $N(4i-2)$ at $t2$ and $N(4i-1)$ and $N(4i)$ at $t5$. A clock time $t6$ therefore the matrix and-circuits has been entirely cleared. Thus the partial products of the matrix are gated out in two successive parallel steps into the initial adder section (ADD1 to ADD8) of the multiplier circuit of FIG. 11. Thus two trains of information will be flowing through the system at a three clock period interval until the clock time $t21$ as will presently appear. The two trains are handled in an identical manner in the system and only the first need be followed in detail in the ensuing explanation.

The second section of the system comprises four totalizer devices of the general type shown in FIG. 8, TOT1 to TOT4, and a pair of binary adders ADN1 and ADN2 each of the type shown in FIG. 4 for receiving a pair of single-sign binary input numbers and putting out a single-sign binary output number. The totalizers such as TOT1, it will be recalled, are adapted to receive an addend number in the form of a positive ordinary binary number (called B in FIG. 8) and an augend in the form of the positive and negative parts (called $An$ and $C'n$) of an algebraic binary number by way of three input lines, and to put out a similar two-part algebraic binary number over a pair of opposite-sign output lines. As shown in FIG. 11, each of the totalizers TOT1 to TOT4 receives as its two-signed augend the two-signed outputs of first-stage adders ADD3 through ADD6 respectively and as its single-signed addend the positive output of the remaining adders ADD1, ADD2, ADD7 and ADD8 respectively. Second-stage adders ADN1 and ADN2 receive as their single-signed inputs the negative outputs from ADD1 and ADD2, and from ADD7 and ADD8, respectively. The input of information into all of the second-stage components just described occurs at time $t4$. The output from the second-stage adders ADN1 and ADN2 is at time $t6$, and the output from the second-stage totalizers TOT1 through TOT4 is at time $t7$. The permanent connections from the output lines of the adders of the initial section to the input lines of the adders or totalizers of the second section are of course so made, in the construction of the machine, that the lines conveying digits of equal binary order are connected together. The same relationship is present throughout the sections of the circuit, so that the proper order of the binary powers is preserved throughout the length of the circuit.

It will be understood that at every stage of the process being described the algebraic sum of positive and negative outputs from all the totalizer and/or adder devices of the stage equals the sum of all the initial N numbers introduced into the system from the matrix network.

In the third stage there are provided the two totalizers TOT5 and TOT6 similar to the second-stage totalizers, and two adders ADD9 and ADN3, the former similar to the first-stage adders and the latter similar to the second-stage adders. Totalizers TOT5 and TOT6 receive as their two-signed augend inputs the two-signed outputs from TOT2 and TOT3 respectively and as their single-signed addend inputs the positive inputs from TOT1 and TOT4 respectively. Adder ADD9 receives as its single-signed inputs the negative outputs from ADN1 and ADN2, and adder ADN3 receives as its inputs the negative outputs from TOT1 and TOT4. The outputs from TOT5 and 6 appear at time $t10$; the output from ADN3 appears at time $t9$; and the output from ADD9 appears at time $t8$ and is therefore passed through a one-clock-period delay element $r1$ to synchronize it with the output from ADN3.

In the fourth section, the outputs from TOT5 are applied (at $t10$) as the augend inputs to a totalizer TOT8, and the positive output from TOT6 is applied as the addend input to the said TOT8. The opposite-signed outputs from ADD9, delayed as just mentioned, are applied at $t9$ as the augend inputs to a totalizer TOT7, the addend input to which is the negative single output from ADN3. There remains the negative output from TOT6, and this is applied to a two-period delay line $r2$ included in the fourth section.

In the fifth section, the outputs from TOT7 are applied as the augend to a totalizer TOT9 and the negative retarded number passed through $r2$ from TOT6 is applied as the addend to TOT9. This occurs at $t12$. The positive and the negative numbers from TOT8 are applied to two-period delay lines $r2$ at time $t13$.

Thus, at time $t15$, the sum being computed has been reduced to just two positive numbers and two negative numbers. These can now therefore be applied as the augend and addend to the four inputs of a complete totalizer comprising a preparatory section as in FIG. 9 followed by a totalizer as in FIG. 8, since the inputs to the preparatory device of FIG. 9 may comprise two positive and two negative sets of lines. The sixth stage of the system being described, accordingly, comprises the preparatory circuit PTA1 similar to that shown in FIG. 9, followed by the totalizer TOT10. Two of the opposite-sign inputs of PTA1 are derived from the opposite-sign outputs of TOT9, and the other two from the delayed outputs passed from TOT8 through the delay lines $r2$. The input occurs at $t15$. Two opposite-sign outputs from PTA1 are applied at $t18$ as the augend input to TOT10 and the remaining positive output from PTA1 is applied as the addend input. Thus the output from TOT10 now comprises a single algebraic binary number expressed as positive and negative part numbers on the paired output lines of the totalizer.

This output as supplied from TOT10 at time $t21$ comprises the sum of the first train of N numbers introduced into the first section of the system at time $t2$. Three clock periods later, it will be recalled, the output lines from TOT10 will put out a further number representing the sum of the second train of N numbers introduced into said initial section at time $t5$. The remaining section of the system of FIG. 11 serves to combine there two numbers into a single number which thus represents the sum total of the partial product sums in the matrix network.

For this purpose there is provided a further stage comprising a preparatory circuit PTA2 similar to PTA1 followed by a totalizer device TOT11. PTA2 has one set of its opposite-sign inputs fed from the output of TOT10 directly, and its other opposite-sign inputs fed from TOT10 by way of three-period delay lines $r3$. In this way at time $t24$ the unit PTA2 simultaneously receives, by way of the delay lines $r3$, the sum derived from the first set of N numbers introduced at time $t2$, and directly receives the sum derived from the second set of N numbers introduced at time $t5$. These two residual numbers are totalized by totalizer TOT11 and at time $t30$ there is obtained at the single pair of output lines from the system, a pair of opposite-sign numbers which represent in algebraic-binary form the product of multiplication of the two factors A and B entered at time $t1$ into the matrix network. This product is stored in any suitable memory device, not shown.

It is noted that at times $t27$ and $t33$ respectively, the output of the system carries two further numbers respectively representing the undelayed first partial sum and the delayed second partial sum due to the provision of the delay lines $r3$. These numbers may be discarded, or they may be prevented from entering PTA2 and thus from appearing at the output of the system by providing suitable clock-inhibited not-circuits operative at times $t21$ and $t24$ at the respective pairs of outputs from TOT10, as shown at INH($t21$) and INH($t24$).

Thus with the totalizer system just described the multiplication process requires a total of only 30 clock periods. More important still, since the matrix network is cleared at time $t5$, a fresh multiplication process may commence at time $t6$. Hence a single multiplier device of the type shown by FIGS. 10 and 11 can be used for repeated multiplications with only five clock periods between successive entries of factor numbers into it. This of course makes for extremely fast computing in the frequent case of problems involving a large number of repetitive multiplications.

In many cases it is of interest to determine rapidly the sign of an algebraic binary number represented by a positive and by a negative part number conveyed over two respective sets of lines. A parallel circuit for this purpose is chosen in FIG. 12. The circuit has the two sets of parallel input lines P and N for the positive and negative part numbers respectively.

Figure 12:
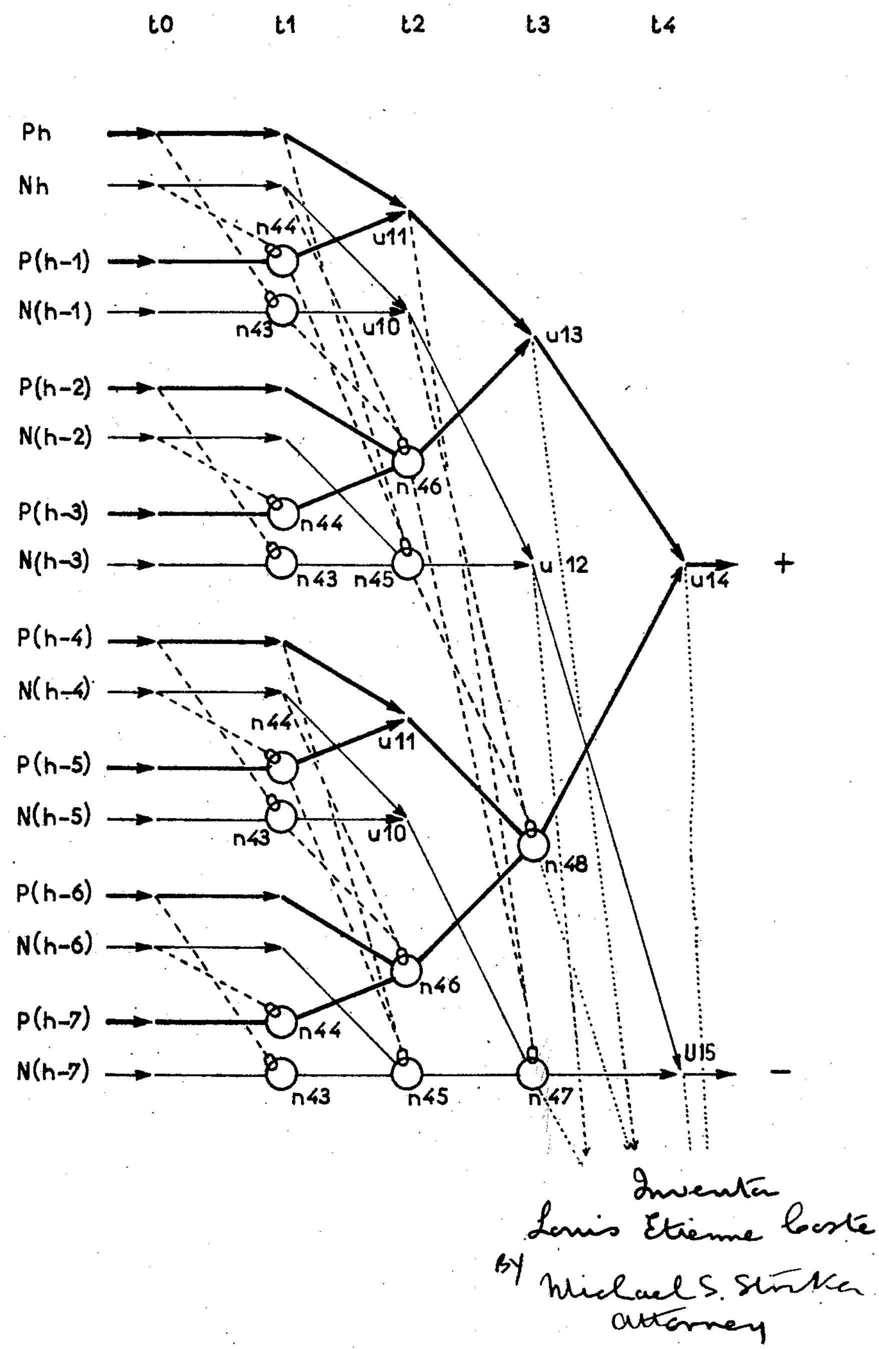
FIG. 12 shows a sign-discriminator circuit.

Obviously the sign of the complete algebraic-binary number is the sign of the digit of highest significance in it. For this reason only the binary stages of higher-significance are shown in FIG. 12, it being understood that the circuit may include as many binary stages as may be desired. The highest stage comprises the pair of positive and negative input lines P$h$ and N$h$, the next lower stage the pair $P(h-1)$ and $N(h-1)$ and so on. The over-all function of the device is to cause the highest-significance digit of the input number to be passed to the single positive output line or to the single negative output line of the circuit depending on whether said highest-significance digit is present in the positive or negative part number, and simultaneously to prevent all lower-significance digits of either part number from reaching the outputs. This is accomplished by a repetitive process which is best understood by reference to the following chart:

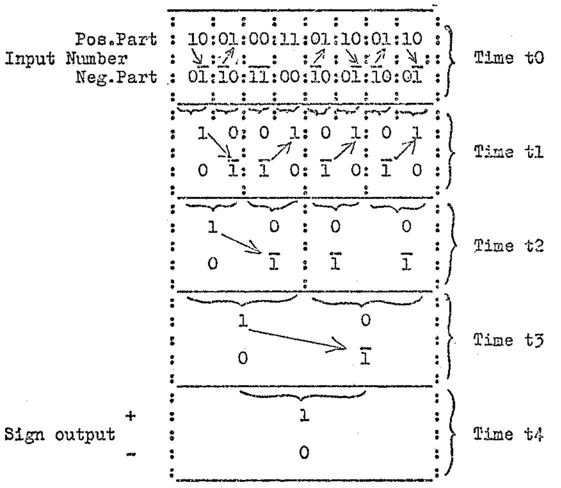

In the above chart it is assumed that it is desired to determine the sign of the exemplary algebraic binary number the positive and negative parts of which are written on the first two lines of the chart. For this purpose, in a first step (time $t0$), the binary stages of the input number are grouped in pairs, starting with the highest, and in each pair a 1 or $\bar{1}$ digit if present in the higher stage of the pair, is made to suppress or inhibit any $\bar{1}$ of 1 digit, respectively, present in the lower stage of the pair. Such inhibitions are indicated on the chart by arrows leading from each inhibitor digit to the digit inhibited by it. Moreover the 1's or $\bar{1}$'s present in both stages of a pair are combined into a single 1 or $\bar{1}$ digit. Thus at the input to the next step (time $t1$), there are half as many digits as there were in the initial number, and each 1 or $\bar{1}$ digit passed on to this next step represents the (positive or negative) sign of a corresponding two-stage group in the initial number. Again these digits are grouped into pairs starting with the highermost, the same inhibiting process is applied as indicated by the arrows, and again equal digits of the same sign are combined into one. Thus there are again passed from the second to the third step half as many digits as were passed to the second step, each 1 or $\bar{1}$ digit now representing the sign of a corresponding group of four stages of the initial number. The process is repeated until finally only a single digit remains, and this appears on the positive output line or the negative output line to represent the + or − sign according to whether the sign of the positive or negative partial input number has predominated. In the example shown, it is seen that it is only the highermost 1 digit present in the positive part number which has been retained, to indicate the + sign.

Returning to FIG. 12, in a first section of the circuit, not-circuits $n43$ and $n44$ serve to effect the inhibitions mentioned above in the first step of the process, these not-circuits being supplied e.g. from input lines $N(h-1)$ and $P(h-1)$ and inhibited from P$h$ and N$h$ respectively and so on for each pair of the input lines. In the next section, considering only the portion of the circuit relating to the highermost group of four input stages, the positive outputs from P$h$ and the first $n44$ are applied to an or-circuit $u11$, and the negative outputs from N$h$ and the first $n43$ are applied to an or-circuit $u10$, while the positive outputs from $P(h-2)$ and the related $n44$ are applied to a not-circuit $n46$ inhibited by the negative outputs from N$h$ the first $n43$, and the negative outputs from $N(h-2)$ and the related $n43$ are applied to a not-circuit $n45$ inhibited by the positive outputs from P$h$ and the first $n44$. This accomplishes the function represented in the section of the chart labelled time $t2$. In the next section of the circuit, considering the portion relating to the eight highermost stages of the input number, the positive outputs from $u11$ and the first $n46$ are applied to or-circuit $u13$, and the negative outputs from $u10$ and the first $n45$ are applied to or-circuit $u12$, while in the lower group of four input stages the positive outputs from $u11$ and the second $n46$ are applied to a not-circuit $n48$ inhibited by the negative outputs from the circuits $u10$ and said first $n45$ of the upper group of four input stages, and the negative outputs from $u10$ and the second $n45$ are similarly applied to a not-circuit $n47$ inhibited by the positive outputs from the circuits $u11$ and said first $n46$ of the said upper group. This yields the outputs indicated in the $t3$ section of the chart. Assuming the circuit only has eight stages, the positive outputs from $u13$ and $n48$ are now combined in a final or-circuit $u14$ whose output is the positive output line of the circuit, and the negative outputs from $u12$ and $n47$ are combined in a final or-circuit $u15$ which yields the negative output line of the circuit.

It will be understood that if the number of stages ($h$) in the circuit is a power of two, i.e. $h=2^k$, then the sign is obtained at the end of $k$ clock periods, if however the number of stages differs from a power of two, i.e. $2^k<h<2^{k+1}$, then $(k+1)$ clock periods are required to obtain the sign. This is because the sign of the uppermost group of $2^k$ input stages is obtained after the sign of the lower group, which includes $(n-2^k)$ stages, has been obtained, so that the outputs from the lower group have to be passed through suitable delay circuits followed by a not-circuit which is inhibited at time $t(k+1)$ by the opposite-sign output from the higher group, so that the sign output then only appears at time $t(k+2)$.

Figure 13:
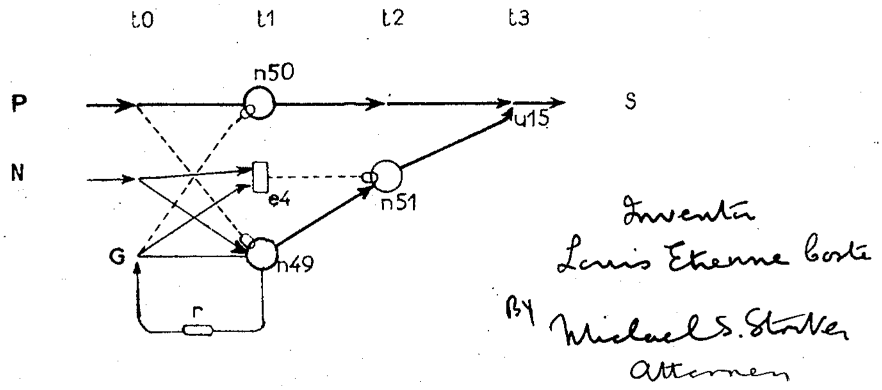
FIG. 13 shows means for serially converting an algebraic-binary number into an ordinary binary number.

With reference to FIG. 13, a circuit will now be described for serially converting an algebraic-binary number into an ordinary binary number. The circuit has the single pair of input lines P and N, over which the digits of the positive and respective parts, respectively, of the input number to be converted, are serially applied in ascending binary order. The circuit has the single output line S, over which the 0 and 1 digits of the ordinary binary number equivalent to the input number are serially transmitted, in ascending binary order.

To understand the operation of this circuit, it should be noted that it has to perform the serial subtraction of the binary number comprising the absolute value of N, from the binary number P, and that the binary numbers are such that in each binary place where the one has a 1, the other has a 0. The binary value 0 or 1 of the digit issuing from S at any clock period depends both on the binary values of each of the corresponding P and N digits, and on whether or not there was a carry-over from a preceding stage, that is, on whether the preceding non-zero input digit had occurred in the positive number P or the negative number N. It is easily seen in these circumstances a 1-digit must be passed to the output S in each of the following cases, and only in those cases:

(*a*) There is a 1 input on line P and the preceding non-zero input was not negative.

(*b*) There is a $\bar{1}$ input on line N and the preceding non-zero input was not negative.

(*c*) There are 0 inputs on both N and P lines and the preceding non-zero input was negative.

These logical functions are effected by the circuit of FIG. 13 in the following manner. The P input is applied to a not-circuit *n*50 and thence through a one-period delay, to one input of an or-circuit *u*15 and thence to the output. The N input is applied through not-circuit *n*49 and not-circuit *n*51 to the other input of *u*15 and thence to the output. The not-circuit *n*49 has an additional output which feeds back any negative input digit through a delay line *r* to an additional input of the not-circuit *n*49, the delay imparted to the fedback digit being such as to synchronize it with the next input digit applied through input line P or N. Further, a delayed feedback signal from the output G of the delay line is applied as an inhibitor input to not-circuit *n*50, while the P input is applied as the inhibitor input to not-circuit *n*49, thereby providing mutual-inhibiting cross-connections whereby any positive digit fed in through P will be canceled together with a negative digit appearing simultaneously with it on the feedback loop. Finally the negative N input and the feedback at G are applied to respective inputs of an and-circuit *e*4 the output of which serves to inhibit *n*51.

With this arrangement, any negative input digit occurring on line N will be stored in the feedback loop until the occurrence of a positive input digit on line P. At that time both opposite-sign digits cancel each other through the action of the cross-connected not-circuits *n*49 and *n*50, so that there is a zero output on line S. This zero output will persist until such time as a positive or negative input digit occurs on either line P or N.

A positive input digit on line P is passed to the output S (to represent a 1 in the output number) unless inhibited at *n*50 by a signal present in the feedback loop, that is unless the preceding non-zero input was negative, thereby satisfying condition (*a*) above.

A negative input digit on line N is passed to the output S (to represent a 1 in the output number) unless inhibited at *n*51 by a signal from and-circuit *e*4, which signal is present at the time the negative input digit reaches *n*51, if there was a signal present in the feedback loop at the time said negative digit was applied; in other words the negative input digit is only inhibited at *n*51 if the preceding non-zero input was negative. Thus condition (*b*) is satisfied.

Finally a signal present in the feedback loop is passed to the output S (to represent a 1 in the output number) unless inhibited at *n*49 by a positive input digit from P, and unless inhibited at *n*51 by a negative input digit from N (through *e*4); in other words the feedback loop passes a signal to the output S to represent a 1 in the output number if both present P and N inputs are 0, and the preceding non-zero input was negative, thus fulfilling condition (*c*).

If the input algebraic binary number is negative, the positive and negative inputs to the circuit of FIG. 13 are reversed and the output number is then, of course, negative.

Figure 14:
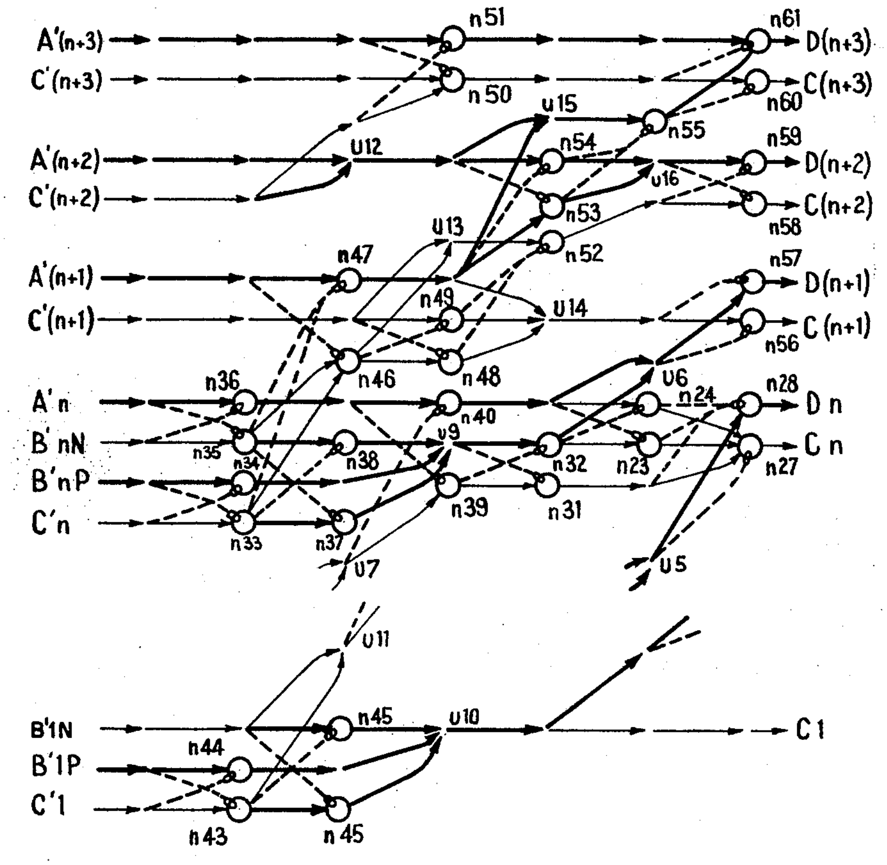
FIG. 14 shows a preferred modification of the totalizer means shown in FIGS. 8 and 9, involving a simplification of the end stages of the totalizer.

Referring to FIG. 14, an improved form of the totalizer hereinabove described with reference to FIGS. 8 and 9 will now be described. The improvement lies in the fact that the lowermost stage and the higher stages of the totalizer are simplified by taking advantage of the fact that the lowermost stage can in no case receive a carry, while the highermost stages can receive only carries. FIG. 14 accordingly illustrates a normal stage of the totalizer, of order *n*, which is entirely identical with the stage of the complete totalizer obtained by combining the circuits of FIGS. 9 and 8 as previously explained, together with a simplified lowermost stage of order 1 and the higher stages of orders $(n+1)$, $(n+2)$ and $(n+3)$.

Since the lowermost stage cannot receive a carry, it does not need to include any output corresponding to the D*n* output of a normal stage and consequently the positive input loop can also be omitted, together with the or-circuit *u*6 providing the positive output line. Moreover the not-circuits corresponding to *n*35, *n*23 and *n*27 are also omitted from the path B1N—C1. Further, since there is no negative carry input, the not-circuits corresponding to *n*32 and *n*27 are omitted. Thus the stage is substantially simplified.

The three highermost stages $(n+1)$ through $(n+3)$ of the totalizer serve to totalize carries exceeding the input capacity of the totalizer, and hence have no input lines other than the loop input lines called A′ and C′. Moreover, the $(n+1)$-stage acts to retain a negative carry digit until occurrence of a further carry digit, whereupon the carry is canceled if said further carry is positive, or else is passed to the higher stage if the further carry is negative. The $(n+2)$-stage performs a similar function in respect to a positive carry digit. The $(n+3)$-stage which is the highermost stage retains a carry digit regardless of sign. While only one pair of stages such as $(n+1)$ and $(n+2)$ have been here shown, more than one similar pairs may be included ahead of the highermost stage here designated $(n+3)$. These stages will now be described in detail.

The $(n+1)$-stage includes a "mutual-inhibiting" circuit of a type many times encountered hereinabove and comprising the not-circuits *n*46 and *n*47, the former connected in the negative carry input line from the preceding stage and the latter in the positive loop input line $A'(n+1)$. The inhibiting input for *n*46 comes from $A'(n+1)$ and that for *n*47 comes from *n*33 and *n*35 from the preceding stage. The output from this mutual inhibition circuit is passed to a semi-adder circuit comprising not-circuit *n*48 connected in the negative carry input line, *n*49 in the negative loop input from $C'(n+1)$ to $C(n+1)$, and or-circuit *u*13 and not-circuit *n*52 connected in the negative carry output line. This semi-adder circuit serves to store a negative digit present in the negative input line just mentioned so long as such digit is present either in the said line or in the carry input line and passes a single carry digit to the next stage in case both these lines contain digits. Both lines are combined by a three-input or-circuit *u*14. The positive input from *n*47 branches out into two positive carry-preparing lines for the higher stages, a first line being applied to *n*53 in the $(n+2)$-stage and another being applied to *u*15 in the $(n+3)$-stage. Further the output from *n*47 yields a negative-carrying branch line leading to the third input of *u*14. The output from *u*14 is connected by way of a one-period delay to the input of not-circuit *n*56 which, together with a not-circuit *n*57 forms a mutual inhibiting circuit similar to that provided by *n*27 and *n*28 in the complete, previously described complete stage of order *n*.

In the $(n+2)$-stage, the $C'(n+2)$ input line is connected to provide at time *t*2 a negative carry-output line towards the next stage, being applied to *n*50 therein, and a positive input line to or-circuit *u*12 which has also applied to it the positive loop line $A'(n+2)$. The output from *u*12 is delayed one period and then branches off into two positive lines, the one applied to *u*15 for transmission of a carry digit to the next stage, and the other applied through $n54$ to the positive loop output for reinsertion into the positive input. The circuit constitutes $n53$, $n54$, $u15$, $u16$ and $n55$ comprises a semi-adder circuit for adding the input digits from the input line $A'(n+2)$ to the carry input digits from the preceding stage. This circuit acts to retain at the $(n+2)$-stage any single incoming digit at either of these inputs, and to transfer a carry digit to the next stage if there is a digit in the preceding stage and a further carry digit is being received at the input. Not-circuit $n59$ provided just ahead of the $D(n+2)$ output and not-circuit $n58$ ahead of the negative $C(n+2)$ output derived from the negative carry from the preceding stage, are cross-connected to provide a mutual inhibition network serving to cancel both outputs when such a negative carry is simultaneously present with an input from the positive loop line.

The $(n+3)$-stage similarly consists exclusively of a positive and a negative pair of loop lines, the negative line $C'(n+3)—C(n+3)$ receiving negative carries from the preceding stage by way of not-circuit $n50$, and the positive line $A'(n+3)—D(n+3)$ receiving positive carries from said preceding stage through $n61$. The input of a new carry digit of the same sign should be prevented since it would lead to an erroneous result. Accordingly, should a carry digit of opposite sign from the digit stored in this stage occur, both digits are canceled by one or the other of the two mutual-inhibiting networks respectively comprising the cross-connected pairs $n50$ and $n51$, and $n60$ and $n61$.

As will be understood from explanations given in the initial part of this application, the so-called normal algebraic-binary code will not generally be the simplest code in which a number can be written in algebraic-binary form. When a binary number is converted into the NAB code, any group of adjacent 1's in the number placed between 0's at either side of the group, is converted into a pair of digits 1 and $\bar{1}$ with intervening 0's. Hence the resulting NAB number is simpler than the initial binary number in cases where three or more adjacent 1 digits are present. However wherever the initial number contains a single 1 digit (either between two 0's or between a 0 and an end of the number), then the resulting NAB number has two (1 and $\bar{1}$) digits for the initial number's single (1) digit. It is in some cases desirable to transpose such a number into an equivalent algebraic-binary number having a smaller quantity of 1's and $\bar{1}$'s therein, even though the modified number will not generally be a RAB number, i.e. may have digits of the same sign in adjacent positions. Such a simplification is accomplished, according to the invention, by effecting a reconversion to ordinary form in certain selected positions. Thus assume for example the ordinary binary number $A=1010110111101$ and its normal algebraic binary equivalent $1\bar{1}1\bar{1}10\bar{1}1000\bar{1}1\bar{1}$. In order to rewrite the latter as a simpler algebraic-binary number all the $1\bar{1}$ groups in it are converted back to 01, that is the conversion $2^{n+1}—2^n$ into $2^n$, reverse from the fundamental conversion according to the invention, is accomplished. This yields the algebraic binary form $10110\bar{1}1000\bar{1}01$ which is simpler both than the normal algebraic number written above and the initial ordinary binary number from which the latter was derived. Such simplification is of especial advantage in connection with multiplication by the usual straightforward process involving successive additions of the displaced multiplicand. It is noted that by a further modification involving conversion of every $\bar{1}1$ group into the equivalent $0\bar{1}$ group, there would be obtained the algebraic form of the initial number having maximum simplicity, that is the minimum amount of 1 and $\bar{1}$ digits.

Figure 15:
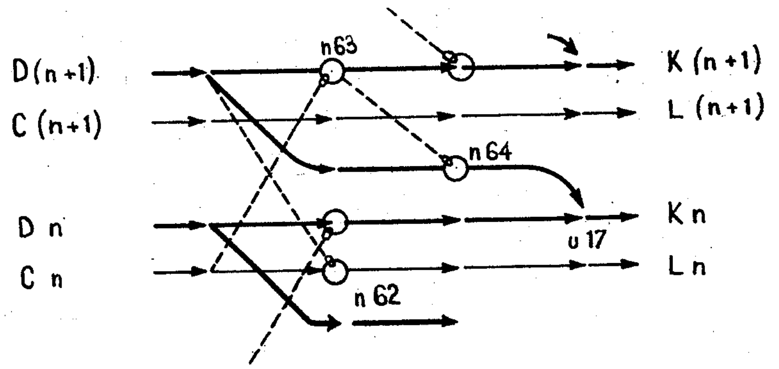
FIG. 15 shows means for simplifying an algebraic binary number by converting a pair of adjacent digits of opposite sign therein into a single digit corresponding in sign to the higher-order digit of the pair.

FIG. 15 illustrates a portion of a circuit for accomplishing the above described simplifying reconversion involving replacement of every $1\bar{1}$ group by a 01 group. Only the two stages $n$ and $(n+1)$ are shown. The positive input line $D(n+1)$ of the $(n+1)$-stage branches out into two positive lines one of which leads to a not-circuit $n63$ acting to retain a positive 1 input digit at the $(n+1)$-stage and the other serving to prepare a positive 1 digit for subsequent carrying back to the preceding $n$-stage. The not-circuit $n63$ is cross-connected with a not-circuit $n62$ in the negative input line $Cn$ of the preceding stage to provide a mutual-inhibition network therewith for cancelling simultaneously present 1 and $\bar{1}$ digits on both lines while permitting a single digit on either line to pass. The aforementioned carry-preparing line from $D(n+1)$ is applied through a one-period delay to a not-circuit $n64$ inhibited from $n63$ and the output from $n64$ is applied to an or-circuit $u17$ providing the positive output $Kn$ of the $n$-stage. Thus this output is inhibited only if there is a 1 input digit on $D(n+1)$ and no $\bar{1}$ input digit on $Cn$, so that any of the input digit applied singly to the device is transmitted unchanged, whereas if both input lines carry digits these are combined into a single positive output digit from the lower stage, as required by the reconversion process to be performed.

A device as just described may have its input connected with the output from a converter or coder device of the type described earlier herein with reference to FIG. 2, and will then serve to convert an ordinary binary input number into an algebraic binary number having fewer 1-digits. The device may also be connected to the output of a totalizer of the kind described with reference to FIG. 14.

Figure 16:
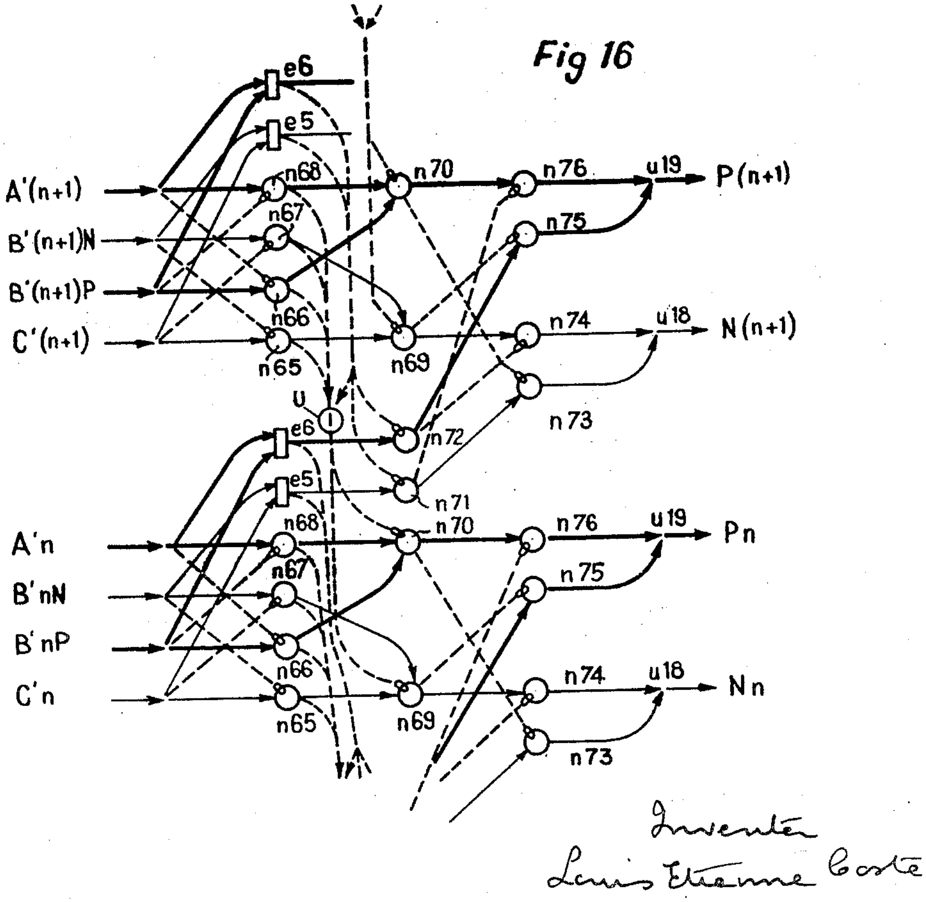
FIG. 16 shows two stages of the means serving to prepare the sign discriminating operation for an algebraic sum while such sum is being computed in a totalizer.

FIG. 16 shows a device for use with the sign discriminator described with reference to FIG. 12, whenever the latter is used for determining the sign of a sum computed by a totalizer, in order to enable the sign-determining process to commence while the totalizer is still computing the sum, thereby achieving a gain in time. In each stage of the circuit shown in FIG. 16, the four input lines are directly connected with the outputs from the not-circuits respectively connected in the similarly designated output lines of the circuit of FIG. 14. Each stage comprises two semi-adder circuits, one associated with the positive inputs and comprising the circuits $n66$, $n68$ and $e6$, and the other associated with the negative inputs and comprising $n65$, $n67$ and $e5$. The outputs from the positive semi-adder of a stage are connected to a common not-circuit $n70$, and those from the negative semi-adder are connected to a not circuit $n69$. Both not-circuits $n69$ and $n70$ are inhibited from united outputs of the not-circuits $n65$ through $n68$ and and-circuits $e5$ and $e6$ of the next higher stage. The outputs from and-circuits $e5$ and $e6$ in the stage under consideration, which deliver the carry digits to the next higher stage, are respectively passed through not-circuits $n71$ and $n72$ inhibited from the outputs of the respective and-circuits $e5$ and $e6$ in the next higher stage. In this way any carry digit from the higher $(n+1)$-stage cancels a carry digit proceeding towards this stage from the lower $n$-stage, while any remaining digit in the $(n+1)$-stage can only cancel a remaining digit in the $n$-stage but cannot cancel a carry digit proceeding towards the $(n+1)$-stage. In either of these cases the sign of the number is unaltered.

The positive carry-transfer line from the $n$-stage is connected with the negative line in the $(n+1)$-stage by way of mutual-inhibition network comprising the cross-connected circuits $n74$ and 75 respectively inhibited from $n72$ and $n69$, and similarly the negative carry transfer line from the $n$-stage is connected with the positive line in the $(n+1)$-stage by way of the cross-connected not-circuits $n73$ and $n76$ mutually inhibited from $n70$ and $n71$ as shown. The positive outputs from $n75$ and $n76$ are then reunited in or-circuit $u19$, and the negative outputs from $n73$ and $n74$ are reunited in $u18$, the outputs from these or-circuits yielding the respective positive and negative outputs from the $(n+1)$-stage. The mutual-inhibition networks just described do not alter the sign of the output number since all they do is cancel both the carry digit and the digit of opposite sign thereto. Because of the presence of the inhibitor inputs from the $(n+2)$-stage to the $(n+1)$-stage in the event that a positive carry digit is transferred from the $n$-stage to the $(n+1)$-stage, there can be no carry digit transferred from the $(n+1)$-stage to the $(n+2)$-stage; and if there is a remaining digit of the same sign in the $(n+1)$-stage, no input digit can have been applied to the $(n+2)$-stage; hence the substitution of a single digit for two digits in the $(n+1)$-stage cannot alter the sign of the number in that the said two digits are of equal significance and similar sign.

The positive output and negative output lines from the device of FIG. 16 are connected with the correspondingly-designated positive and negative inputs of the sign-discriminating circuit shown in FIG. 12 previously described.

There will now be described with reference to FIG. 17 a stepping memory device for handling binary and algebraic binary numbers according to the invention. This device will accept an input number in binary or algebraic-binary form applied thereto either in parallel or in series as desired, is able to store the number, to shift the input number through a desired number of binary stages, and read out the shifted number as a parallel or a series output while retaining the shifted number in storage. Means are also provided for clearing the memory during or after read-out.

The memory device shown in FIG. 17 comprises a pair of memory lines LP and LN for the positive and negative parts of an algebraic binary number respectively. Each memory line consists of a series of cascaded bistable elements or flipflops such as *f*1, one for each stage of the memory. Each flipflop has three united "setting" inputs, which may for convenience be considered as applied to it by way of an or-circuit, and a single "resetting" input. Of the three setting inputs, one is derived from the "set" output of the flipflop of the next higher stage by way of a not-circuit *n*77, a second one is derived from the "set" output of the flipflop of the next lower stage by way of a not-circuit *n*771, and a third is derived from a corresponding stage line issuing out of a suitable parallel source device. In the drawing it may be assumed that such source device is provided by a totalizer of the type shown for example in FIG. 14, and the inputs to the respective stages of the positive and negative memory lines LP and LN have accordingly been designated by the same designations D and C as the positive and negative output lines from the totalizer of FIG. 14. The "resetting" input to each flipflop *f*1 is derived from a common shift command line designated S*h*. The "set" output from each flipflop *f*1 branches out into four lines, two of which lead to the setting inputs of adjacent stage flipflops through not-circuits as just described and the other two lead through respective not-circuits *n*78 and *n*79 to a first and a second parallel output, respectively of the stage. One of these outputs has been designated by the reference B'P for the positive line and B'N for the negative line, to indicate that these outputs may be fed to the similarly designated input lines of the totalizer of FIG. 14. The remaining outputs may be directed to any other desired receiver device. All not-circuits *n*771 are inhibitable in parallel from a first inhibitor line J0, and all not-circuits *n*77 are inhibitable from a second inhibitor line J1, while all not-circuits *n*79 and *n*78 are inhibitable from the third and fourth inhibitor lines J2 and J3, respectively.

With this arrangement a positive and a negative input number may be entered in parallel into the stages of the respective lines LP and LN through the stage inputs such as D*n* and C*n*, whereupon such numbers may be shifted "downwards" (i.e. towards the lower digital orders) by application of shift command pulses to lines S*h* and simultaneous energization of J0, or they may be shifted upwards by application of the shift command pulses to S*h* with simultaneous energization of J1. During such stepping process both inhibitor lines J2 and J3 would normally be energized to prevent read-out. When desired to read out a number to either of the (or both) receiver sources, inhibitor lines J2 or/and J3 may be selectively deenergized whereupon the digits will appear in parallel at the B' outputs or/and the other undesignated outputs shown. The numbers may be stored without stepping for an indefinite period of time by omitting to apply shift pulses to the S*h* lines. To clear the memory lines, both inhibitor lines J0 and J1 are energized.

Instead of the parallel entry of the input numbers into the memory lines as just described, the numbers may be entered serially into them as from the highermost stages. Also, instead of parallel read-out of the numbers, serial output may be effected as from the lowermost stage (not shown) simply by applying a sufficient number of shift command pulses to lines S*h*.

Figure 18:
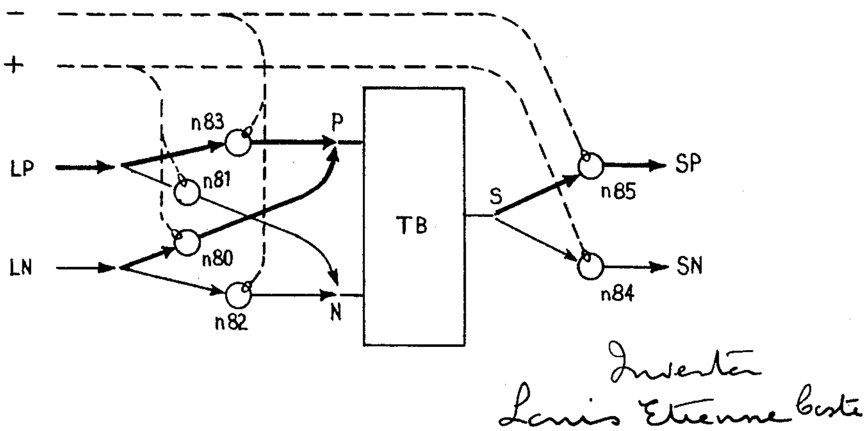
FIG. 18 shows means including the circuit of FIG. 13 for serially converting an algebraic-binary into an ordinary binary number regardless of sign.

FIG. 18 illustrates use of the stepping memory device just described in conjunction with an algebraic-binary-to-binary conversion system of the type described with reference to FIG. 13. This device is here shown as the block TB. As mentioned in the description of FIG. 13, in case of sign reversal of the input numbers applied to the converter device the sign of the output must be reversed. It is assumed that the algebraic binary number to be converted to binary by the device TB is the sum total of a plurality of positive and negative numbers as computed by a totalizer such as that shown in FIG. 14. Associated with the totalizer is a sign discriminator circuit of the kind shown in FIG. 12, having its positive and negative outputs connected to the inputs of a flipflop element not shown, the outputs of which are connected to the respective lines shown dashed in FIG. 18, the one designated with the + sign, the other with the − sign, the connections being such that when the sign-discriminator has ascertained the content of the totalizer as positive, the + line is maintained energized, and when negative the − line is energized.

The LP and LN shift lines of the stepping memory of FIG. 17, having its inputs connected to the totalizer stage outputs as previously explained, have their lowermost stage outputs connected to the P and N inputs of the TB circuit in the manner shown. Specifically, the lowermost stage outputs of line LP are connected through not-circuits *n*81 and *n*83, to the one inputs of respective or-circuits feeding the inputs P and N of converter TB, while not-circuits *n*80 and *n*82 associated with the outputs of LN are similarly connected to the other inputs of said or-circuits. Not-circuits *n*80 and *n*81 are inhibited from the + line, and not-circuits *n*82 and *n*83 are inhibited from the minus line. The single output S from the converter TB branches off into two lines forming the inputs to not-circuits *n*85 and *n*84 respectively inhibited from the − and the + lines. The outputs from the not-circuits *n*85 and *n*84 respectively provide the positive and negative outputs SP and SN of the converter device.

In operation, at a time when the totalizer content is positive, so that the + line is energized, the digits serially issuing from LP and LN are directed to the P and N inputs, respectively, of the converter since *n*80 and *n*81 are inhibited. Since simultaneously *n*84 is inhibited the ordinary binary output number issues as a positive number on line SP. If on the other hand the content of the totalizer is ascertained as negative, the inhibitions are reversed *n*82, *n*83 and *n*85 now being inhibited, so that the positive and negative part numbers issuing from the memory are now applied to the negative and positive inputs, respectively, of the converter, and the converted output now issues as a negative number at SN.

The invention further provides a method of testing the correctness of computing operations performed in the algebraic binary codes by means of any of the circuits so far described, or others working on similar principles. This checking method essentially resides in associating with the (or each) pair of positive and negative lines which are consistently used herein to carry the digits 1 and $\bar{1}$ of the positive and binary parts of an algebraic binary number, a third or zero line which carries a signal when and only when neither of the 1 and $\bar{1}$ lines carries a signal. Thus every binary digit, whether 1, $\bar{1}$ or 0, is represented by an information signal. The 0 signal is normally disregarded in the actual computation processes and is only used in transfer operations. This enhances the reliability of the computations.

Figure 19:
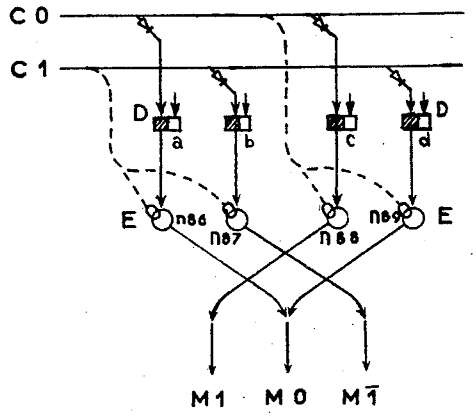
FIG. 19 shows means for converting an ordinary binary into a NAB number represented in a modified error-checking code.

Referring to FIG. 19, the diagram illustrates a circuit for serially converting an ordinary binary number into a normal algebraic binary number represented in the three-signal safety code thus provided. The input binary number is assumed to be applied serially, starting with the higher orders to the input lines C0 and C1, which are alternately energized to represent the 0's and 1's respectively of the binary number. The output from the device is provided by the three lines M1, M0, M$\bar{1}$. In the NAB output number resulting from the conversion of the input number, a 1 is represented by energization of line M1 only, a $\bar{1}$ by energization of M$\bar{1}$ only, and a 0 by energization of M0 only.

To obtain this result, there is provided an array D of four bistable elements or flipflops *a, b, c, d,* followed by an array E of four not-circuits *n*86, *n*87, *n*88, *n*89. Flipflops *a* and *c* have their setting inputs supplied from C0 and their set outputs feeding the not-circuits *n*86 and *n*88 which respectively supply the M0 and M1 output lines. Flipflops *b* and *d* have their setting inputs supplied from C1, their set outputs supplying *n*87 and *n*89 which respectively feed the M$\bar{1}$ and M0 output lines. All four flipflops are reset by the clock pulses as indicated. Not-circuits *n*86 and *n*87 are inhibited from C1, and not-circuits *n*88 and *n*89 are inhibited from C0.

Consider an ordinary binary number serially applied to this device by alternate energization of the lines C0 and C1 in accordance with the 0 and 1 digits of the number, starting with the highest binary order. At the start of the process flipflops *a* and *c* each contain an information stored therein since they are connected to the C0 input line which is initially energized. The highest 1 digit of the input number energizes C1 and deenergizes C0. This transfers the two digits stored in *a* and *c* to the E array, in which the *a* digit is suppressed by not-circuit *n*86 inhibited by (energized) line C1, while the *c* digit is passed to the output line M1. Simultaneously energization of C1 has stored 1 digits in flipflops *b* and *d* preparatory to the next step.

Assuming the next highest binary input digit is again a 1, C1 is again energized and the information stored in D is transferred to E but the *b*-digit is inhibited by *n*87 and only the *d*-digit is thus passed through *n*89 to output line M0. On the contrary, should the next highest digit of the input binary number be 0, then *n*89 is inhibited suppressing the *d*-digit while *n*87 is uninhibited so that only the *b*-digit is passed to output line M$\bar{1}$. In this case information digits are again stored in *a* and *c* preparatory to the next digital step.

Thus it can be seen that the device described effectively converts an ordinary binary input number into an algebraic binary output number in accordance with the conversion process of this invention previously described and that the output number is in this case expressed in the ternary safety code such that each 1, 0, and $\bar{1}$ digit in it is represented by energization of one and only one of three output lines M1, M0 and M$\bar{1}$. The circuit of FIG. 19 may easily be modified so as to perform a similar serial conversion process upon a binary number serially applied in ascending rather than descending digital order to the input lines C0 and C1.

Figure 20:
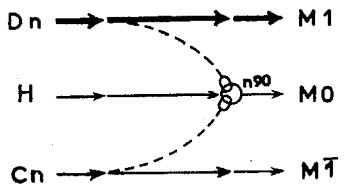
FIG. 20 shows means for converting a NAB number into an ordinary binary number represented in the error-checking code.

FIG. 20 shows the simpler device serving to convert an algebraic binary input number into a corresponding number represented in the safety code. The digits of the positive and negative parts of the input number are serially applied by way of D*n* and C*n* respectively. An auxiliary input line H carries the uniform train of clock pulses. The output comprises the three lines M1, M0, M$\bar{1}$ as previously. Lines D*n*, H and C*n* are connected respectively with M1, M0 and M$\bar{1}$, a not-circuit *n*90 being interposed between the lines H and M0, and inhibited from both D*n* and C*n*. Clearly the output line M0 will only carry a signal when neither of the inputs D*n* and C*n* carries a signal.

Figure 21:
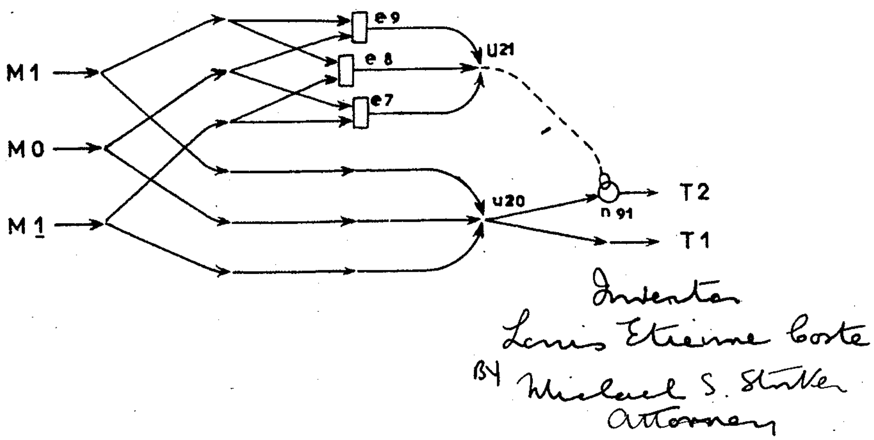
FIG. 21 shows an error-checking device used with that code.

FIG. 21 shows an error detecting or checking device utilizing the ternary code just described. The three input lines M1, M0, M$\bar{1}$ are each connected with one input of a three-input or-circuit *u*20 and with one input of each of two out of three and-circuits *e*7, *e*8, *e*9, the outputs of which are applied to another three-input or-circuit *u*21. The output from *u*20 branches off into two outputs lines T1 and T2, the latter having interposed in it a not-circuit *n*91 which is inhibited from the output of or-circuit *u*21. Clearly should there be more than one information signal among the three input lines, then one at least of the three and-circuits puts out a signal and this inhibits the output at T2. When on the other hand only a single one of the three input lines carries information, as is the case in normal operation, both output lines T1 and T2 transmit output signals. This indicates correct operation of the computing circuits with which the checking device is associated.

*Summary*

I have disclosed herein a method and means of high-speed digital computation based on the so-called algebraic-binary algorithm. This involves the representation of multi-digit binary numbers as the algebraic sum of a positive and a negative binary part number. Means have been described for converting an ordinary binary number into a so-called "normal" algebraic-binary number wherein the positive part number equals twice the original binary number and the negative part number equals the negative of the original binary number, and for processing the resulting part numbers. Means have likewise been described for processing algebraic-binary numbers in normal and/or in other than normal form in combination with one another and/or with ordinary binary numbers, and it has been shown that such operations will require considerably less time and/or equipment than similar operations performed in the conventional binary representation, due inter alia to the elimination of multiple carry transfer.

While the invention is of especial interest when applied to computers operating in the parallel mode, and most of the circuits have been shown as parallel circuits, it will be evident that the principles of the invention can be embodied also in serial computation when occasion demands. The arithmetic operations described herein have included addition, subtraction and multiplication, in addition to certain logical functions such as sign-discrimination and others. The operations and functions referred to are not exhaustive of the scope of applicability of the algebraic-binary algorithm as herein defined. The operator circuits specifically shown and described for performing these operations and functions, while at present preferred, are of course to be regarded as exemplary embodiments of my invention.

I wish it to be understood therefore that this invention is not limited to the matter specifically shown and described herein, either as regards the mathematical and logical functions amenable to the "algebraic-binary" algorithm as herein defined, or as regards the design of the logical circuitry employed in performing such functions.

In the ensuing claims the expression "bivalent signals" is used to designate information signals capable of assuming either one of two predetermined states or values respectively representing the digits 0 and 1 of binary numeration.

What I claim is:

1. In a digital computer, a code-converter device comprising input line means, positive output line means, and negative output line means, means for applying to the input line means bivalent signals representing the 0 and 1 digits of a multi-digit binary input number, and logical circuitry connected with the input and output line means and operative in response to said input signals to apply to the positive output line means bivalent signals representing the 0 and 1 digits of a positive binary part number, and apply to the negative output line means bivalent signals representing the 0 and 1 digits of a negative binary part number, the algebraic sum of which part numbers equals said input number, said circuitry including means preventing simultaneous application to both the positive and negative output line means of signals representing 1-digits of corresponding digital order.

2. In a digital computer, a code-converter device comprising input line means, positive output line means and negative output line means, means for applying to the input line means bivalent signals representing the 0 and 1 digits of a multi-digit binary input number, and logical circuitry connected with the input and output line means and operative in response to said input signals to apply to the positive output line means bivalent signals representing the 0 and 1 digits of a positive binary part number equal to twice said input number, and apply to the negative output line means bivalent signals representing the 0 and 1 digits of a negative part number equal to the negative of said input number, whereby the algebraic sum of said part numbers equals said input number, and said circuitry including means preventing simultaneous application to both the positive and negative output line means of signals representing 1-digits of corresponding digit order.

3. In a digital computer, a code-converter device comprising a plurality of parallel digital stages each comprising an input line, a positive output line and a negative output line, means for simultaneously applying to said input lines bivalent signals representing the 0 and 1 digits of a multi-digit binary input number, and logical circuitry connected with the input and output lines and operative in response to said input signals to apply to the positive output lines bivalent signals representing the 0 and 1 digits of a positive binary part number and apply to the negative output lines bivalent signals representing the 0 and 1 digits of a negative binary part number the algeraic sum of which part numbers equals said input number, said circuitry including means preventing application of 1-digit signals to both the positive and negative output lines of any digital stage.

4. In a digital computer, a code-converter device comprising a plurality of parallel digital stages each comprising an input line, a positive output line and a negative output line, means for simultaneously applying to said input lines bivalent signals representing the 0 and 1 digits of a multi-digit binary input number, and logical circuitry connected with the input and output lines and operative in response to said input signals to apply to the positive output lines bivalent signals representing the 0 and 1 digits of a positive binary part number equal to twice said input number and apply to the negative output lines bivalent signals representing the 0 and 1 digits of a negative binary part number equal to the negative counterpart of said input number, whereby the algebraic sum of said part numbers equals said input number, and said circuitry including means preventing application of 1-digit signals to both the positive and negative output lines of any digital stage.

5. A computer according to claim 4, wherein said logical circuitry comprises a pair of inhibitor circuits in each digital stage each inhibitor circuit including a digital input an inhibitor input and an output, one of said inhibitor circuits having its digital input connected to said input line its inhibitor input connected to the input line of the preceding stage and its output connected to the negative output line of said first mentioned stage, and the other inhibior circuit having its digital input connected to said preceding-stage input line, its inhibitor input connected to the input line of said first mentioned stage and its output connected to the positive output line, of said first-mentioned stage.

6. A digital computer as claimed in claim 1, further including an arithmetic operator unit having further positive and negative input line means respectively connected with said first-mentioned positive and negative output line means and having further positive and negative output line means, and including logical circuitry for separately processing the signals representing the positive and negative part numbers from said first-mentioned output line means in accordance with the rules of binary arithmetic to apply to said further positive and negative output line means of the operator unit bivalent signals representing the positive and negative parts of a result number.

7. In a digital computer the combination of a first and a second code-converting device of the type claimed in claim 3, and an adder unit having a plurality of parallel digital stages each stage comprising a first positive and a first negative input line respectively connected to the positive and negative output lines from the corresponding stage of said first code-converting device and a second positive and a second negative input line respectively connected to the positive and negative output lines from the corresponding stage of said second code-converting device, and logical circuitry connected with said adder input an output lines and operative in response to the bivalent signals applied to both positive input lines of the adder to apply to said positive output lines of the adder bivalent signals representing a positive number which is the arithmetic sum of both said positive part numbers and apply to the negative output lines of the adder bivalent signals representing a negative number which is the arithmetic sum of both the negative part numbers, said logical adder circuitry including means preventing application of 1-digit signals to both the positive and output lines of any stage of the adder.

8. In a digital computer a plurality of stages each comprising a positive and a negative input line and a positive and a negative output line, means applying to said positive and negative input lines bivalent signals representing the digits of a positive and a negative binary part number respectively, and a transcriber unit connected between said input and output lines and including logical circuitry operative in response to said input signals to apply to said positive and negative output lines bivalent signals representing the digits of a positive and a negative output binary part number having the same algebraic sum value as that of said input part numbers but wherein neither of said output numbers includes 1-digits in adjacent stages, including means preventing application of 1-digits to both positive and negative output lines of a common stage.

9. A computer as claimed in claim 7 and comprising further logical circuitry connected to the output lines of one of said code-converting devices and to associated input lines of the adder unit and selectively operable to either of two conditions in a first one of which 1-digit signals occurring on the positive and negative output lines of the said device are respectively directed to positive and negative input lines of the adder and in the other of which said signals are respectively directed to negative and positive input lines of the adder, whereby said adder can both add and subtract.

10. In a parallel digital computer a plurality of stages each comprising a positive and a negative input line and a positive and a negative output line, means for applying to said positive and negative input lines bivalent signals representing the digits of a positive and a negative binary input part number, respectively, and a pair of inhibitor circuits in each stage each having a digital input, an output and an inhibitor input, said inhibitor circuits having their digital inputs connected to said positive and negative input lines and their outputs connected to the positive and negative output lines of the particular stage, respectively, and each inhibitor circuit having its inhibitor input connected to the digital input of the other inhibitor circuit of said stage, whereby to apply to said positive and negative output lines bivalent signals representing the digits of a positive and a negative binary output part numbers equal in algebraic sum to that of said input part numbers but free of opposite-sign 1-digits in any given stage.

11. In a digital computer an adder device having first and second input means and having positive and negative output line means, means for applying to the first input means bivalent signals representing 0 and 1 digits of a multi-digit augend binary number and means for applying to said second input means bivalent signals representing the 0 and 1 digits of a multi-digit addend binary number, and logical circuitry connected to said input and output means operative in response to occurrence of an input signal representing a 1-digit of predetermined digital order in either one and only one of said input means to apply an output signal representing a 1-digit of corresponding digital order to said negative output means and to simultaneously apply an output signal representing a 1-digit of next higher order to said positive output means, and further operative in response to occurrence of input signals representing 1-digits of a predetermined digital order in both said first and second input means to apply an output signal representing a 1-digit of next higher digital order to the positive output means, said circuitry including means preventing simultaneous application of output signals representing 1-digits of equal digital order to both output means, whereby the output signals applied to the positive and negative output means will respectively represent a positive and negative binary part number the algebraic sum of which equals the sum of said augend and addend numbers.

12. In a parallel digital computer an adder device including a plurality of digital stages each comprising a first and a second input line and a positive and a negative output line, means applying to the first input lines bivalent signals representing the digits of a multi-digit augend binary number and means applying to the second input lines bivalent signals representing the digits of a multi-digit addend binary number, and logical circuitry connected to said input and output lines operative in response to occurrence of a 1-digit signal in either one and only one of the input lines of a stage to apply a 1-digit output signal to the negative output line of the same stage and simultaneously apply a 1-digit output signal to the positive output line of the next higher stage, and further operative in response to occurrence of 1-digit signals in both input lines of a stage to apply a 1-digit output signal to the positive output line of the next higher stage, said circuitry including means preventing simultaneous application of 1-digit output signals to both output lines of any stage, whereby the output signals applied to said positive and negative output lines will respectively represent a positive and a negative binary part number the algebraic sum value of which equals the sum of said augend and addend numbers.

13. A computer according to claim 12 wherein each stage includes a third input line and further logical circuitry operative in response to a 1-digit signal applied to the third input line of a particular stage to apply a 1-digit output signal to the negative output line of the stage including means for preventing simultaneous application of 1-digit input signals to the second and third input lines of any stage and means preventing simultaneous application of 1-digit output signals to the positive and negative output lines of any stage.

14. A computer according to claim 13 including a preparatory circuit for said adder device and having a corresponding number of digital stages each including a first and a second positive and a first and second negative input line and each having a first and a second positive and a negative output line, said first and second positive output lines from each stage of the preparatory circuit respectively connected to the first and second input lines of a corresponding stage of the adder device and said negative output line of the preparatory circuit connected to the third input line of the corresponding stage of the adder device, whereby bivalent signals representing the positive and negative parts respectively of an augend and an addend number may be applied to the input lines of said preparatory circuit, and said preparatory circuit including logical circuitry operative in response to the application of such input signals thereto to apply to said first positive, said second positive and said negative output lines thereof bivalent signals representing the digits of two positive and a negative number having the same combined algebraic sum value as the combined algebraic sum value of said augend and addend part numbers, and including means preventing application of 1-digit signals to both a positive output line and the negative output line of any stage.

15. A computer according to claim 14, including means connecting back the positive output lines of the adder device to the first positive input lines of the preparatory circuit in corresponding stages, and means connecting back the negative output lines of the adder device to the first negative input lines of the preparatory circuit in corresponding stages, for repeated totalization of sequentially applied numbers.

16. In a parallel digital computer, a plurality of digital stages each comprising a positive and a negative line, means applying to said positive lines bivalent signals representing the 0 and 1 digits of a positive binary part number and applying to said negative lines bivalent signals representing the 0 and 1 digits of a negative binary part number and means preventing application of 1-digit signals to both lines of any stage; and a sign-discriminating circuit having a plus sign output and a minus sign output and logical circuitry operative in response to said applied signals to transmit to one of said plus and minus outputs only the 1-digit signal present in a line of the highest digital order according to whether said 1-digit signal is present in the positive or the negative line of said highest order and preventing transmission to both said sign outputs of any 1-digit signal present in lower-order lines.

17. In a digital computer a positive and a negative input line, means serially applying to both lines respective and synchronous trains of bivalent signals representing the 0 and 1 digits of a positive and a negative binary number, respectively including logical means for preventing application of simultaneously-occurring 1-digit signals on both lines; an output line; and logical circuitry operative in response to the applied signals to apply to said single output line a train of bivalent signals representing the 0 and 1 digits of a binary number which is the algebraic sum of both said positive and negative numbers.

18. In a parallel digital computer a plurality of digital stages each comprising a positive and a negative line, means applying to said positive lines bivalent signals representing the 0 and 1 digits of a positive part number and means applying to said negative lines bivalent signals representing the 0 and 1 digits of a negative part number, and means preventing application of 1-digit signals to both lines of any stage; and a partial re-converting circuit including a corresponding plurality of digital stages each having a positive and negative input line respectively connected to said first-mentioned lines and each having a positive and a negative output line, and logical circuitry operative in response to a 1-digit signal applied to the positive input line of one digital stage to apply a 1-digit signal to the positive output line of the same digital stage unless inhibited by the occurrence of a 1-digit signal in the negative input line of the next lower stage, and to apply a 1-digit signal to the positive output line of said next lower stage if thus inhibited, and further operative in response to a 1-digit signal applied to the negative input line of one stage to apply a 1-digit signal to the negative output line of the same stage unless inhibited by the occurrence of a 1-digit signal in the positive input line of the next higher stage, whereby said output lines have applied thereto bivalent signals representing the digits of further positive and negative numbers having the same algebraic sum value as said first numbers but generally having fewer 1-digits therein.

19. In a digital computer a memory device comprising a positive and a negative array of bistable two-state elements, an input to each element of each array, means for applying to corresponding inputs of both arrays bivalent signals representing digits of a respective positive and a respective negative binary input number including means preventing application of 1-digit signals to the inputs of corresponding elements of both arrays; shift command means operable to shift the states of said elements stepwise in a selected sense through both arrays simultaneously thereby to step said binary input numbers through the arrays; and inhibitable outputs from the elements of each array operable for reading out the numerical contents of both arrays.

20. In a digital computer a pair of input lines and means for selectively energizing said lines in serial alternation for representing the 0 and 1 digits of a binary input number, three output lines comprising a +1-line, a 0-line and a −1-line, and logical circuitry connected with said input and output lines and operative in response to serial energization of said input lines to energize said output lines one at a time to represent the 1, 0 and −1-digits of an algebraic binary number having a positive part equal to twice said input number and a negative part equal to the negative counterpart of said input number.

21. In a digital computer, positive and negative input lines and means for applying thereto bivalent input signals to represent the digits of respective digital order of a positive and a negative binary input number respectively including means preventing simultaneous application of signals representing 1-digits of common digital order in both numbers; a set of three output lines associated with a pair of said input lines and logical circuitry operative in response to an input signal applied to an input line and representing a 1-digit of predetermined digital order to apply a signal to a related one of two of said associated three output lines and operative in response to non-application of a signal to either of said input lines to apply a 1-digit signal to the remaining one of said three output lines.

22. In a computer as claimed in claim 21, a checking device having three inputs and having a first and a second output, said three inputs of the checking device being respectively connected to said first-mentioned three output lines and logical circuitry operative in response to the occurrence of a 1-digit signal on any one and only one of said three inputs to apply 1-digit signals to both said outputs and operative in response to the simultaneous occurrence of 1-digit signals on more than one of said three inputs to apply a 1-digit signal to only said first output.

23. In a digital computing system for processing at least two binary operand numbers, logical circuitry for deriving from each operand number bivalent signals representing a pair of binary part numbers such that their difference equals said operand number, and binary operator means connected with said circuitry for separately processing the signals representing said positive and negative part numbers of the sets in accordance with the rules of binary calculus.

24. In a digital computing system for processing at least two binary operand numbers, logical circuitry for deriving from each operand number bivalent signals representing a positive and a negative binary part number, which positive number equals twice said operand number and which negative number equals the negative counterpart of said operand number, including means for inhibiting those signals representing correspondingly-positioned +1 and −1 digits in both part numbers for each operand, and binary operator means connected with said logical means for separately processing the uninhibited digits of the positive and negative part numbers of said sets in accordance with the rules of binary calculus.

References Cited in the file of this patent

UNITED STATES PATENTS 2,852,699 Ruhman ---------------- Sept. 15, 1958